US011888249B2

(12) United States Patent
Nakajima

(10) Patent No.: US 11,888,249 B2
(45) Date of Patent: Jan. 30, 2024

(54) CONNECTOR AND ELECTRONIC DEVICE

(71) Applicant: KYOCERA CORPORATION, Kyoto (JP)

(72) Inventor: Nobuyuki Nakajima, Tokyo (JP)

(73) Assignee: KYOCERA CORPORATION, Kyoto (JP)

( * ) Notice: Subject to any disclaimer, the term of this patent is extended or adjusted under 35 U.S.C. 154(b) by 592 days.

(21) Appl. No.: 17/049,816

(22) PCT Filed: Apr. 8, 2019

(86) PCT No.: PCT/JP2019/015317
§ 371 (c)(1),
(2) Date: Aug. 2, 2021

(87) PCT Pub. No.: WO2019/208188
PCT Pub. Date: Oct. 31, 2019

(65) Prior Publication Data

US 2021/0351532 A1 Nov. 11, 2021

(30) Foreign Application Priority Data

Apr. 25, 2018 (JP) ................................ 2018-084472

(51) Int. Cl.
*H01R 13/24* (2006.01)
*H01R 12/88* (2011.01)
(Continued)

(52) U.S. Cl.
CPC ......... *H01R 12/88* (2013.01); *H01R 12/7011* (2013.01); *H01R 12/77* (2013.01);
(Continued)

(58) Field of Classification Search
CPC .......... H01R 12/88; H01R 1/77; H01R 12/77; H01R 12/79
See application file for complete search history.

(56) References Cited

U.S. PATENT DOCUMENTS 6,773,287 B2 * 8/2004 Takashita ............... H01R 12/85 439/495
7,201,605 B2 4/2007 Yamada et al.
(Continued)

FOREIGN PATENT DOCUMENTS

CN 1815814 A 8/2006
JP 2006216242 A 8/2006
(Continued)

*Primary Examiner* — Neil Abrams
(74) *Attorney, Agent, or Firm* — Duane Morris LLP

(57) ABSTRACT

A connector (10) comprises: an insulator having an insertion groove into and from which a connection object (60) is insertable and removable; an actuator configured to rotate between an unlock position in which the connection object (60) is insertable and removable and a lock position in which the actuator presses the connection object (60), with respect to the insulator; and a contact held by the insulator and configured to be in contact with the connection object (60), wherein the contact includes: a first contact portion configured to be in contact with the connection object (60); and a second elastic portion configured to engage with a cam portion formed in the actuator and bias the actuator toward the lock position, the actuator includes: an operation portion configured to be operated toward the unlock position; and a support portion protruding more in a direction opposite to the operation portion than the cam portion, and configured to be in contact with the connection object (60) inserted in the insertion groove in the unlock position of the actuator.

7 Claims, 17 Drawing Sheets

(51) Int. Cl.

| | |
|---|---|
| ***H01R 12/70*** | (2011.01) |
| ***H01R 12/77*** | (2011.01) |
| ***H01R 13/629*** | (2006.01) |
| ***H01R 13/639*** | (2006.01) |

(52) U.S. Cl.
CPC ....... *H01R 13/2407* (2013.01); *H01R 13/629* (2013.01); *H01R 13/639* (2013.01)

(56) References Cited

U.S. PATENT DOCUMENTS

| | | | | |
|---|---|---|---|---|
| 8,083,542 | B2 * | 12/2011 | Kodaira | H01R 12/594 439/497 |
| 8,858,249 | B2 * | 10/2014 | Honda | H01R 12/88 439/495 |
| 9,859,639 | B2 | 1/2018 | Tagami | |
| 2006/0172590 | A1 | 8/2006 | Yamada et al. | |
| 2010/0029128 | A1 * | 2/2010 | Takahira | H01R 12/88 439/345 |
| 2019/0044263 | A1 * | 2/2019 | Manba | H01R 12/88 |
| 2021/0351532 | A1 * | 11/2021 | Nakajima | H01R 13/2407 |
| 2022/0285867 | A1 * | 9/2022 | Nakajima | H01R 13/631 |

FOREIGN PATENT DOCUMENTS

| | | | |
|---|---|---|---|
| JP | 2015043299 | A | 3/2015 |
| JP | 2017045545 | A | 3/2017 |

* cited by examiner

CONNECTOR AND ELECTRONIC DEVICE

CROSS REFERENCE TO RELATED APPLICATION

This application claims priority to and the benefit of Japanese Patent Application No. 2018-084472 filed on Apr. 25, 2018, the entire disclosure of which is incorporated herein by reference.

TECHNICAL FIELD

The present disclosure relates to a connector and an electronic device.

BACKGROUND

As connectors used in electronic devices and the like, connectors configured to enable easy removal of connection objects for improvement in workability are conventionally known. The demand for connectors with improved workability are greater, for example, in the case where all processes in production of electronic devices and the like are automatically performed by machinery without intervention of an operator and in the case where insertion and removal are manually performed in maintenance of electronic devices.

For example, with an electric connector for flat conductors described in PTL 1, a series of operations of moving a movable member to an unlock position and then extracting a flat conductor can be carried out easily.

CITATION LIST

Patent Literature

PTL 1: JP 2015-043299 A

SUMMARY

A connector according to an embodiment of the present disclosure comprises: an insulator having an insertion groove into and from which a connection object is insertable and removable; an actuator configured to rotate between an unlock position in which the connection object is insertable and removable and a lock position in which the actuator presses the connection object, with respect to the insulator; and a contact held by the insulator and configured to be in contact with the connection object, wherein the contact includes: a first elastic portion configured to be in contact with the connection object; and a second elastic portion configured to engage with a cam portion formed in the actuator and bias the actuator toward the lock position, the actuator includes: an operation portion configured to be operated toward the unlock position; and a support portion protruding more in a direction opposite to the operation portion than the cam portion, and the support portion has a support surface configured to, in the unlock position, be in contact with the connection object inserted in the insertion groove.

DETAILED DESCRIPTION

Figure 1:
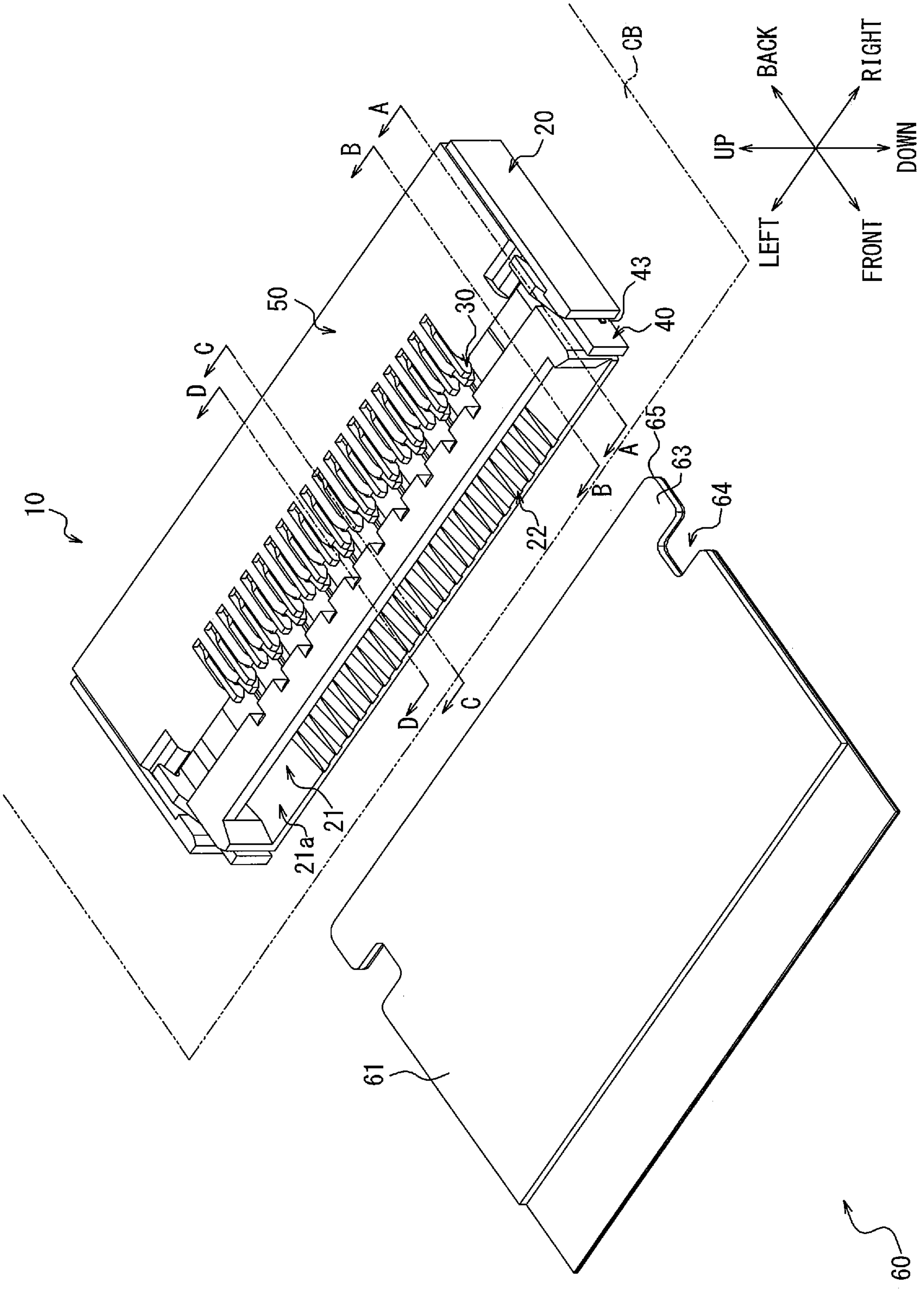
FIG. 1 is a perspective top view illustrating a connector according to an embodiment and a connection object in a separated state.

Electronic devices and the like are increasingly miniaturized in recent years. This involves reduction of a work space in an electronic device for, for example, insertion and removal of a connection object into and from a connector. Hence, further miniaturization of a connector mounted on a circuit board in the electronic device is needed. For example, the height of the connector needs to be reduced. Moreover, the foregoing demand to improve workability further increases as the work space is reduced.

With regard to the electric connector for flat conductors described in PTL 1, no consideration is given to achieving both miniaturization and workability improvement for the connector. More specifically, in the electric connector for flat conductors described in PTL 1, a shell attached to a housing has a mechanism for maintaining a movable member in an unlock position and a mechanism for biasing the movable member toward a lock position. The use of the shell causes an increase of the number of components of the connector, and an increase of the height of the connector.

A connector according to an embodiment of the present disclosure has a simple structure and thus can be reduced in height, and also can improve workability when removing a connection object.

An embodiment of the present disclosure will be described in detail below, with reference to the attached drawings. The directions such as front, back, right, left, up, and down in the following description are based on the directions of the arrows in the drawings. The directions of the arrows are consistent throughout FIGS. 1 to 11D. In the drawings except FIG. 1, a circuit board CB is omitted for the sake of simplicity.

Although a connection object 60 connected to a connector 10 according to the embodiment is described as a flexible printed circuit board (FPC) as an example, the connection object 60 is not limited to such. The connection object 60 may be any object that is electrically connected to the circuit board CB via the connector 10. For example, the connection object 60 may be a flexible flat cable (FFC).

In the following description, it is assumed that the connection object 60 is connected to the connector 10 in parallel with the circuit board CB on which the connector 10 is mounted. More specifically, the connection object 60 is connected to the connector 10 in the front-back direction as an example. Herein, the term "insertion/removal direction" includes the front-back direction as an example. The term "insertion direction" includes the backward direction as an example. The term "removal direction" includes the forward direction as an example. The term "insertion side" includes the back side. The term "removal side" includes the front side. The connection method is not limited to the foregoing method. The connection object 60 may be connected to the connector 10 in a direction perpendicular to the circuit board CB. The circuit board CB may be a rigid board, or any circuit board other than a rigid board.

Figure 2:
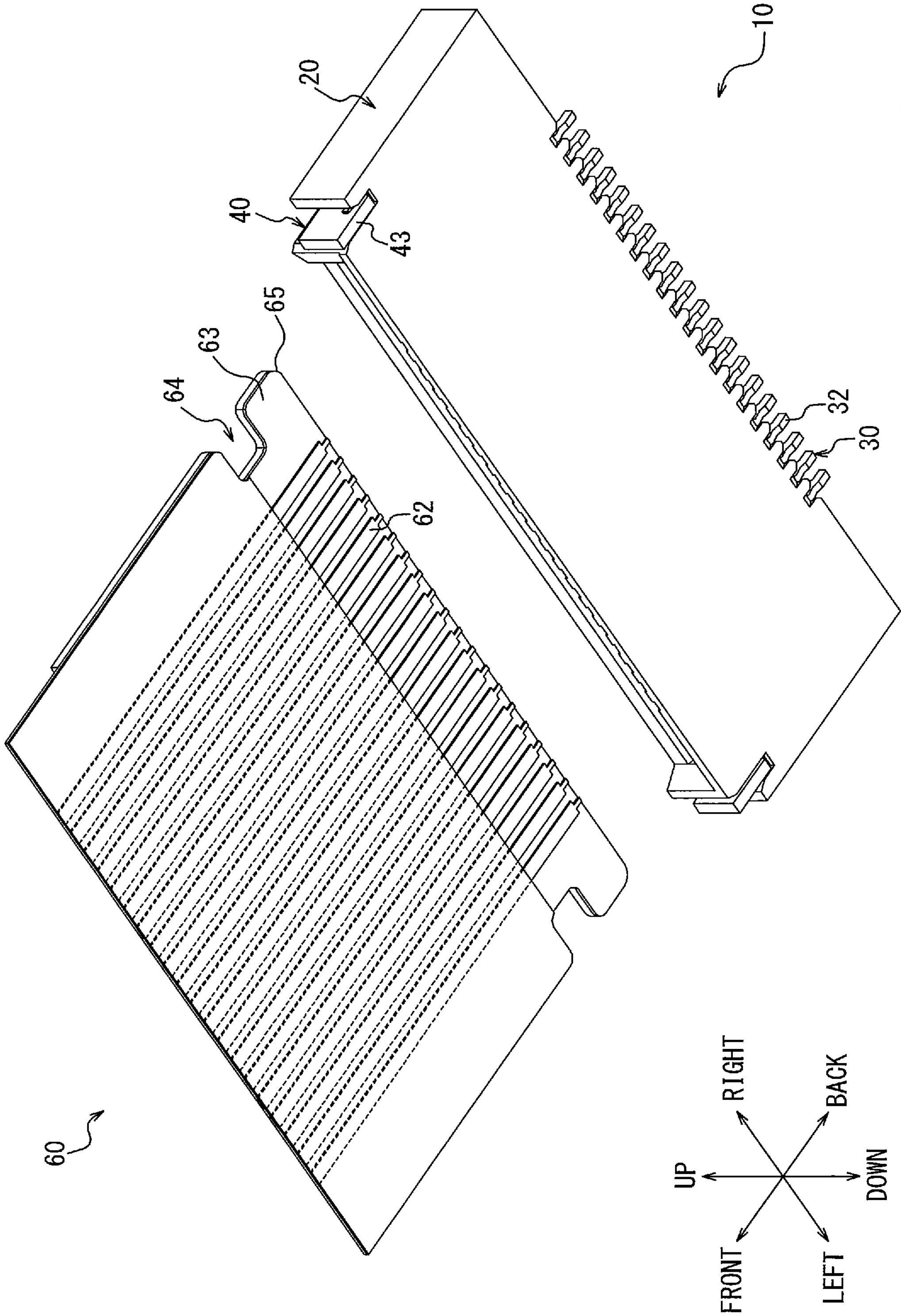
FIG. 2 is a perspective bottom view illustrating the connector and the connection object in FIG. 1.
Figure 3:
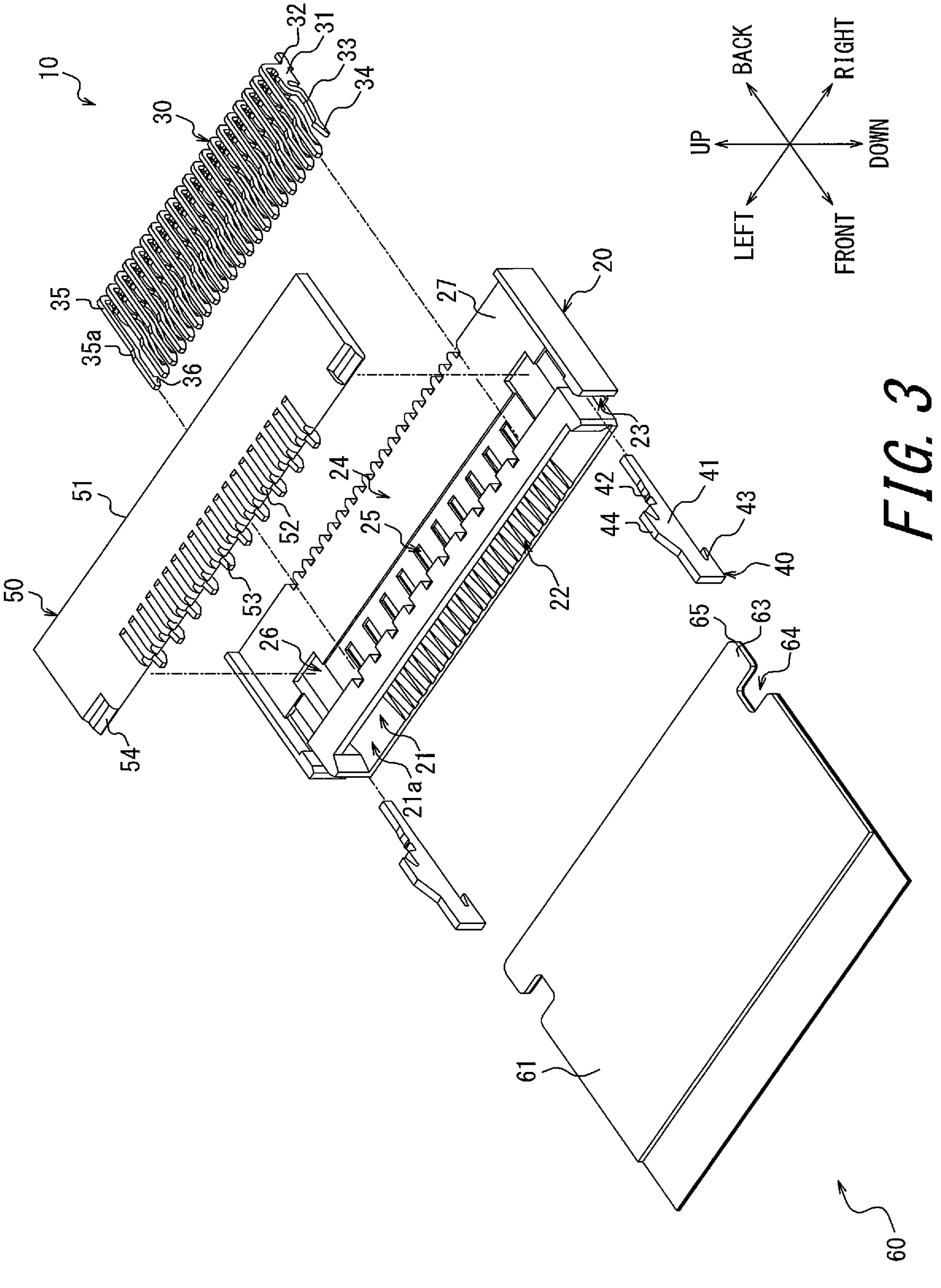
FIG. 3 is an exploded perspective view of the connector 10 in FIG. 1.
Figure 4:
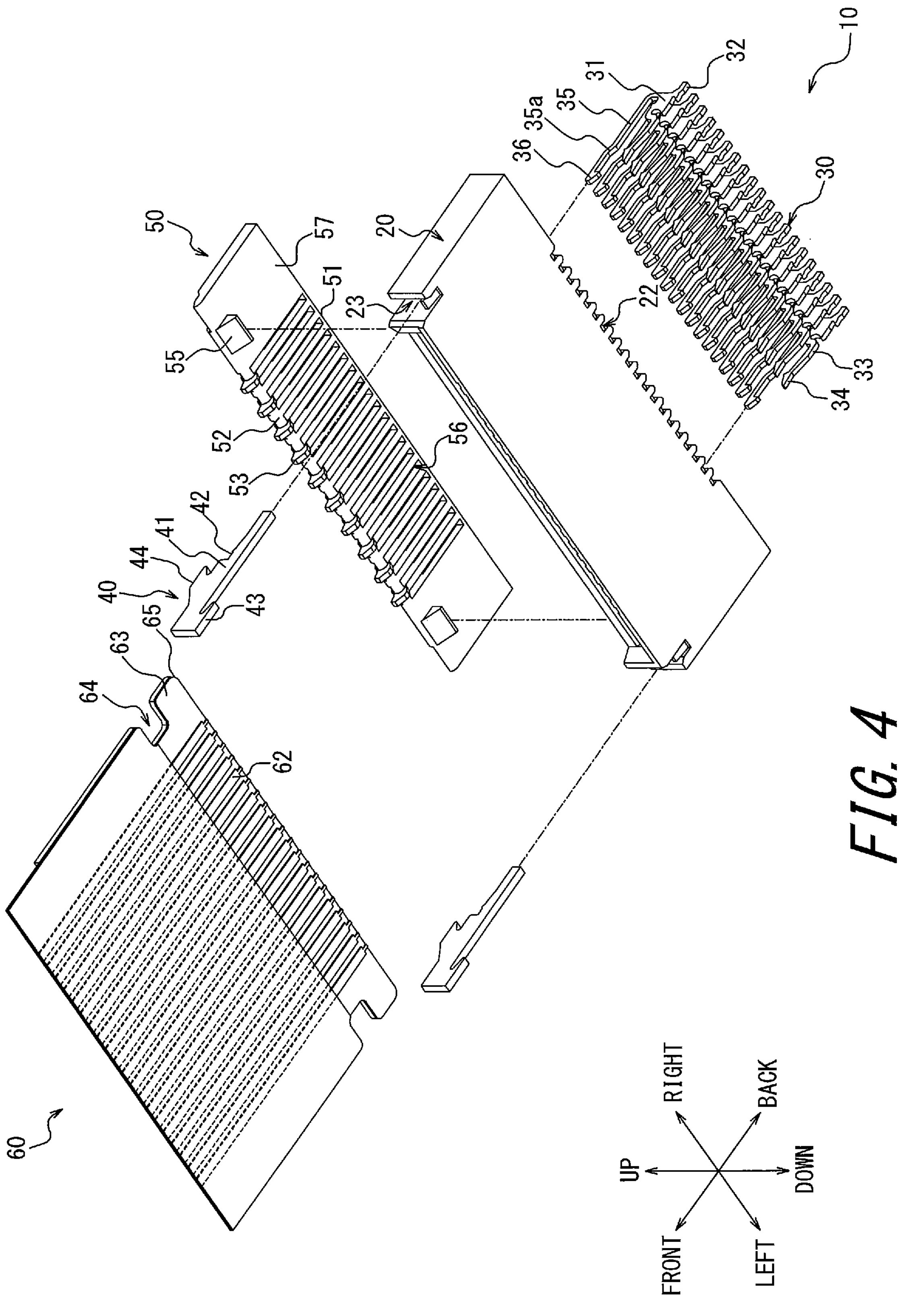
FIG. 4 is an exploded perspective view of the connector 10 in FIG. 2.

FIG. 1 is a perspective top view illustrating the connector 10 according to the embodiment and the connection object 60 in a separated state. FIG. 2 is a perspective bottom view illustrating the connector 10 and the connection object 60 in FIG. 1. FIG. 3 is an exploded perspective view of the connector 10 in FIG. 1. FIG. 4 is an exploded perspective view of the connector 10 in FIG. 2. The structures of the connector 10 according to the embodiment and the connection object 60 will be mainly described below, with reference to FIGS. 1 to 4.

With reference to FIGS. 3 and 4, the connector 10 according to the embodiment includes an insulator 20, one or more contacts 30, a metal fitting 40, and an actuator 50, as main structural elements. For example, the connector 10 is assembled by the following method. The actuator 50 is attached to the insulator 20 from above. The contacts 30 are press-fitted into the insulator 20 from behind. As a result, the contacts 30 are supported by the insulator 20, and are in contact with the actuator 50. The metal fitting 40 is press-fitted into the insulator 20 from front. As a result, the metal fitting 40 supports the right and left ends of the actuator 50 from below, and prevents the actuator 50 from coming off upward.

With reference to FIG. 1, the connector 10 is mounted on the circuit board CB. The connector 10 electrically connects the connection object 60 and the circuit board CB via the contacts 30.

With reference to FIG. 3, the insulator 20 is a box-shaped member obtained by injection molding an insulating and heat-resistant synthetic resin material. The insulator 20 has an insertion groove 21 extending in the right-left direction and having a width in the insertion/removal direction. The connection object 60 is inserted into and removed from the insertion groove 21. The insertion groove 21 has an opening 21*a* on the front side. The width of the opening 21*a* in each of the up-down direction and the right-left direction gradually increases from the insertion side to the removal side, to improve workability when inserting the connection object 60. The opening 21*a* has a tapered shape in which each of the up-down width and the right-left width gradually decreases toward the inside of the insertion groove 21.

The insulator 20 has a plurality of first installation grooves 22 passing through the back surface and recessed on the bottom surface of the insertion groove 21 to the front end. Each first installation groove 22 extends in the front-back direction. The plurality of first installation grooves 22 are arranged in the right-left direction apart from each other at predetermined intervals. The first installation grooves 22 are arranged so as to include the arrangement region of the contacts 30 in the right-left direction.

The insulator 20 has a second installation groove 23 passing through the back surface and extending to the front end, at each of the right and left ends. The front half part of the second installation groove 23 is open upward. The back half part of the second installation groove 23 is inside the insulator 20.

The insulator 20 has a containing portion 24 recessed as a result of being greatly notched at its upper surface. The containing portion 24 receives the upper part of each contact 30 and the actuator 50.

The insulator 20 has a plurality of first through holes 25 in the front part of the bottom surface of the containing portion 24. Each first through hole 25 communicates between the insertion groove 21 and the containing portion 24. Each first through hole 25 passes through the insulator 20 from the bottom surface of the containing portion 24 to the insertion groove 21. The plurality of first through holes 25 are arranged in the right-left direction apart from each other at predetermined intervals.

The insulator 20 has a second through hole 26 at each of the right and left ends of the bottom surface of the containing portion 24. The second through hole 26 communicates between the insertion groove 21 and the containing portion 24. The second through hole 26 passes through the insulator 20 from the bottom surface of the containing portion 24 to the insertion groove 21.

The insulator 20 has a lock position regulating portion 27 composed of the back half part of the bottom surface of the containing portion 24. The lock position regulating portion 27 includes a flat surface facing upward.

With reference to FIGS. 3 and 4, each contact 30 is obtained by forming a thin plate of a copper alloy or a corson copper alloy having spring elasticity, such as phosphor bronze, beryllium copper, or titanium copper, into the illustrated shape using progressive forming (stamping). The contact 30 is formed only by blanking. The working method for the contact 30 is, however, not limited to such, and may include bending in the thickness direction after blanking. The contact 30 is approximately U-shaped in a side view in the right-left direction. The surface of the contact 30 is nickel-plated to form a base, and then plated with gold, tin, or the like as a surface layer plating. A plurality of contacts 30 are arranged in the right-left direction.

Each contact 30 has a latch 31 that is fixed in the first installation groove 22 of the insulator 20. The contact 30 has a mounted portion 32 extending backward from the lower end of the latch 31. The contact 30 has an elastically deformable first elastic portion 33 extending forward from the latch 31. The first elastic portion 33 bends forward from the latch 31 approximately in a crank shape, and then linearly extends obliquely upward. The contact 30 has a contact portion 34 located at the tip of the first elastic portion 33.

The contact 30 has an arm portion 35 extending from the upper end of the latch 31. The arm portion 35 bends from the latch 31 approximately in an L-shape, and then extends forward. The arm portion 35 has, in its front half part, a second elastic portion 35*a* including a part inclined in the up-down direction. The contact 30 has an engaging portion 36 at the tip of the second elastic portion 35*a*. The arm portion 35 and the first elastic portion 33 are separated by the containing portion 24 formed in the insulator 20, in the up-down direction.

The metal fitting 40 is obtained by forming a thin plate of any metal material into the illustrated shape using progressive forming (stamping). The metal fitting 40 has a base portion 41 extending in the front-back direction. The front half part of the base portion 41 protrudes upward in a stepwise manner with respect to the back half part of the base portion 41. The metal fitting 40 has a latch 42 formed on the upper surface of the back half part of the base portion 41 and fixed in the second installation groove 23. The metal fitting 40 has a mounted portion 43 protruding downward from the front lower end of the base portion 41. The metal fitting 40 has a pressing portion 44 protruding from the upper surface of the front half part of the base portion 41.

The actuator 50 is a plate-shaped member obtained by injection molding an insulating and heat-resistant synthetic resin material and extending in the right-left direction. The actuator 50 has an operation portion 51 constituting the back edge and extending in the right-left direction. The operation portion 51 is formed at the end of the actuator 50 in the insertion direction of the connection object 60. The actuator 50 has a plurality of cam portions 52 formed approximately throughout a center part of the front edge in the right-left direction. The plurality of cam portions 52 are arranged at predetermined intervals so as to include the arrangement region of the contacts 30 in the right-left direction. The actuator 50 has a plurality of support portions 53 each protruding forward and downward from between a corresponding pair of cam portions 52. Each support portion 53 protrudes more toward the side opposite to the operation portion 51, than the cam portion 52. The plurality of support portions 53 are arranged in the right-left direction apart from each other at predetermined intervals. The support portions 53 are formed in the actuator 50 at least throughout the arrangement region of the contacts 30. The actuator 50 has a pressed portion 54 formed by notching each of the right and left ends of the front side of the upper surface.

The actuator 50 has a locking portion 55 located near each of the right and left ends of the front side of the lower surface and protruding downward from the lower surface. The actuator 50 has a plurality of receiving grooves 56 linearly recessed on the lower surface and extending in the front-back direction. The receiving grooves 56 are arranged in the right-left direction apart from each other at predetermined intervals. The receiving grooves 56 are arranged so as to include the arrangement region of the contacts 30 in the right-left direction. The front part of each receiving groove 56 is open upward. The actuator 50 has a lock position regulated portion 57 composed of approximately the whole lower surface.

With reference to FIG. 1, the connector 10 is mounted on a circuit forming surface formed on the upper surface of the circuit board CB placed approximately parallel to the insertion/removal direction. Specifically, the mounted portion 32 of each contact 30 is placed on a solder paste applied to a signal pattern on the circuit board CB. The mounted portion 43 of each metal fitting 40 is placed on a solder paste applied to a ground pattern on the circuit board CB. Each solder paste is heated to melt in a reflow furnace or the like, to solder the mounted portion 32 to the signal pattern and solder the mounted portion 43 to the ground pattern. This completes mounting of the connector 10 on the circuit board CB.

With reference to FIGS. 1 and 2, the connection object 60 has a stack structure formed by bonding a plurality of thin film materials to each other. The connection object 60 has a reinforcement portion 61 constituting a tip part in the extending direction, i.e. the insertion/removal direction, and harder than other parts. The connection object 60 has a plurality of signal lines 62 linearly extending in the insertion/removal direction. Each signal line 62 is covered by the exterior of the connection object 60 from below on the removal side, but is exposed downward in the tip part in the insertion/removal direction. Each signal line 62 may be used for grounding. The connection object 60 has a contact portion 63 at each of the right and left ends of the tip part in the reinforcement portion 61. The connection object 60 has a locked portion 64 adjacent to the contact portion 63 on the removal side and formed by notching the side edge of the reinforcement portion 61. The connection object 60 has an R-shaped guide portion 65 at each corner of the contact portion 63 on the insertion side.

Figure 5A:
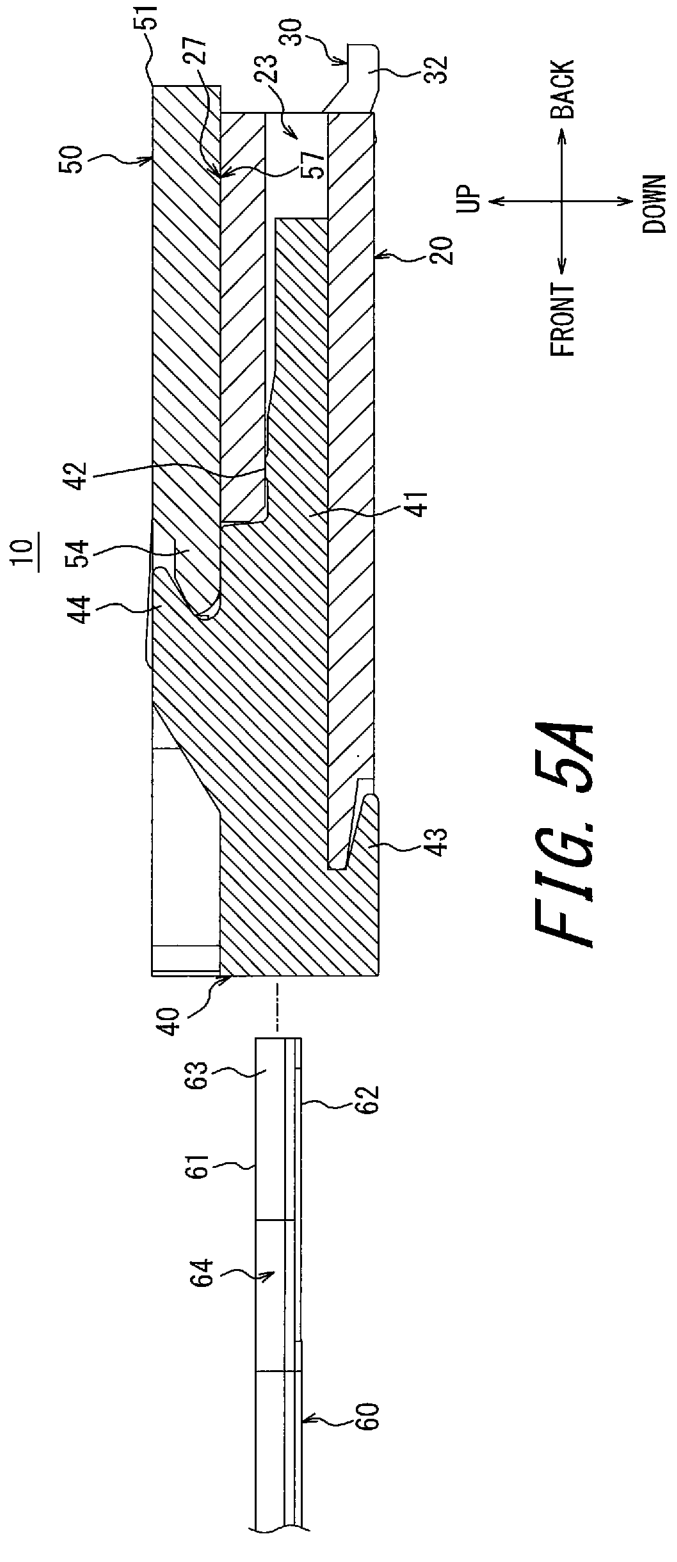
FIG. 5A is a sectional view along arrow A-A in FIG. 1.
Figure 5B:
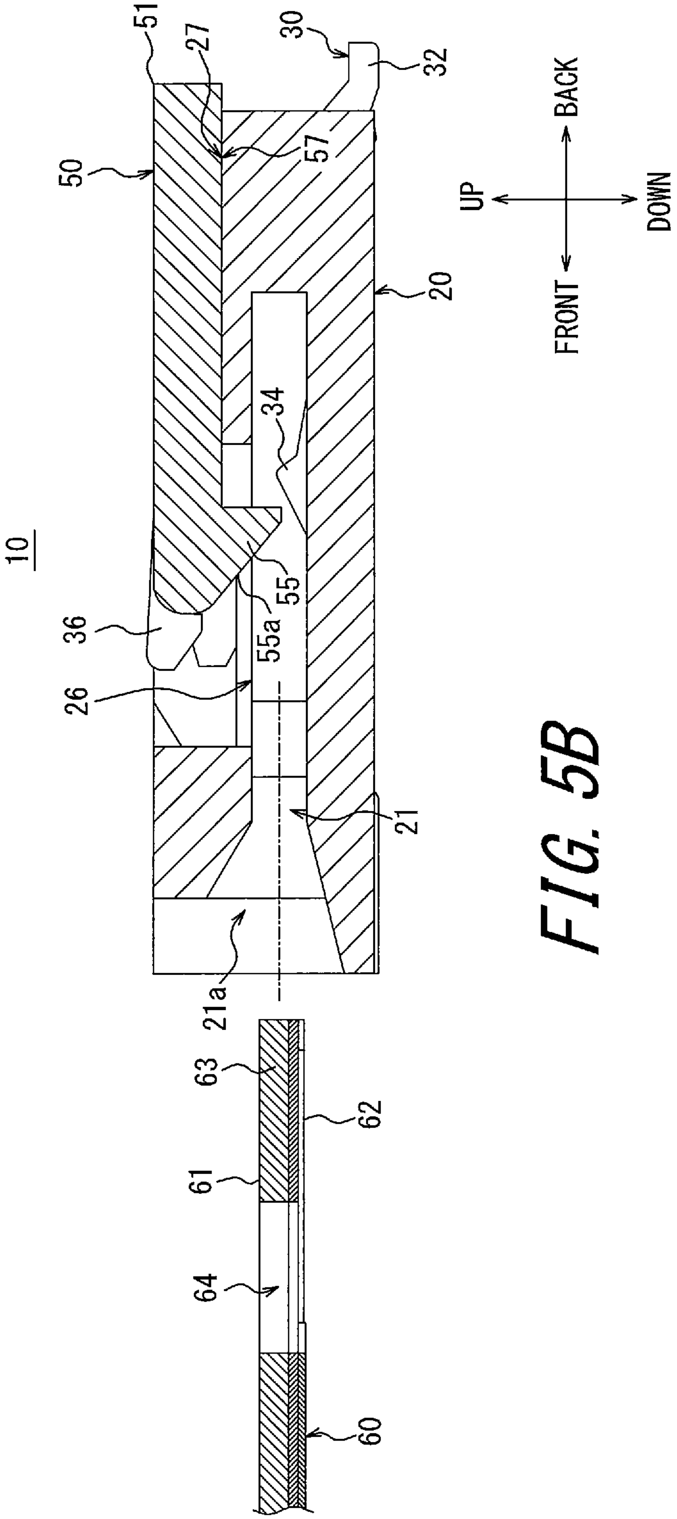
FIG. 5B is a sectional view along arrow B-B in FIG. 1.
Figure 5C:
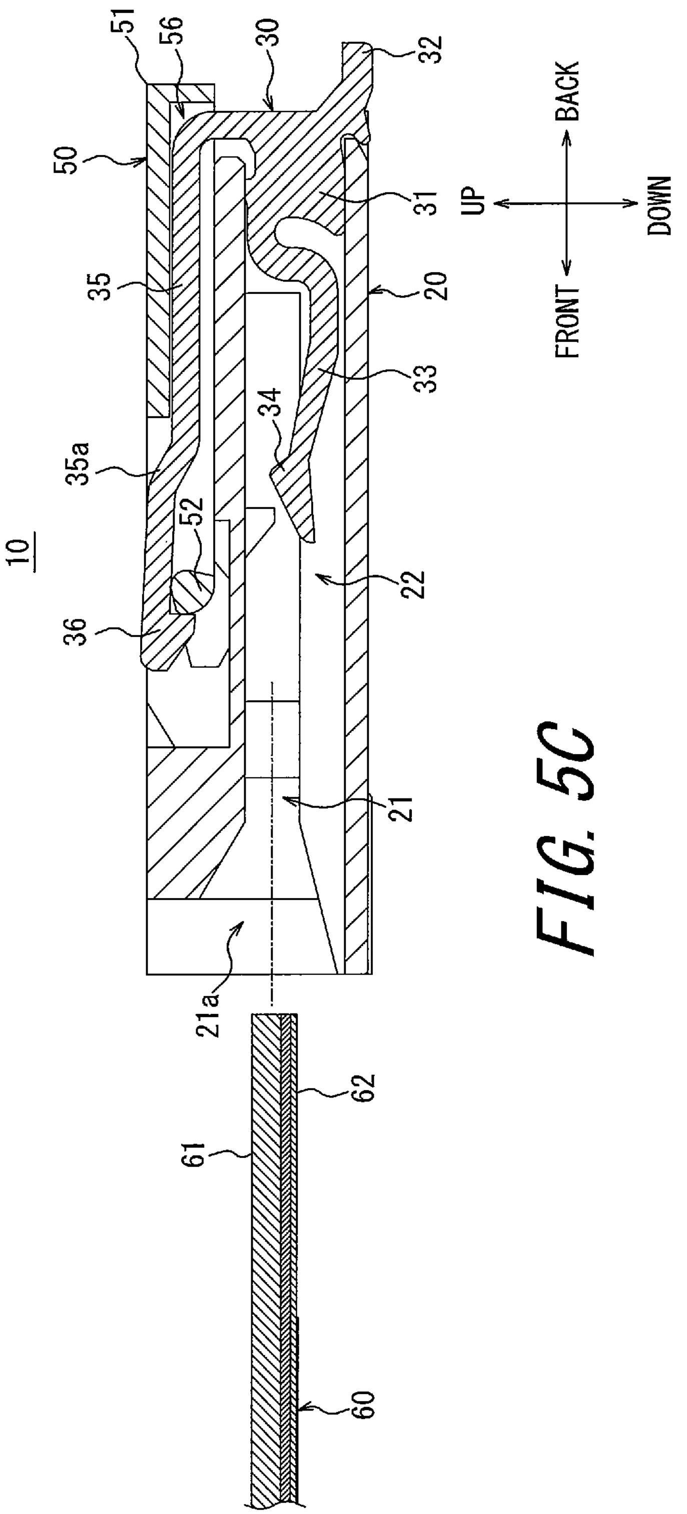
FIG. 5C is a sectional view along arrow C-C in FIG. 1.
Figure 5D:
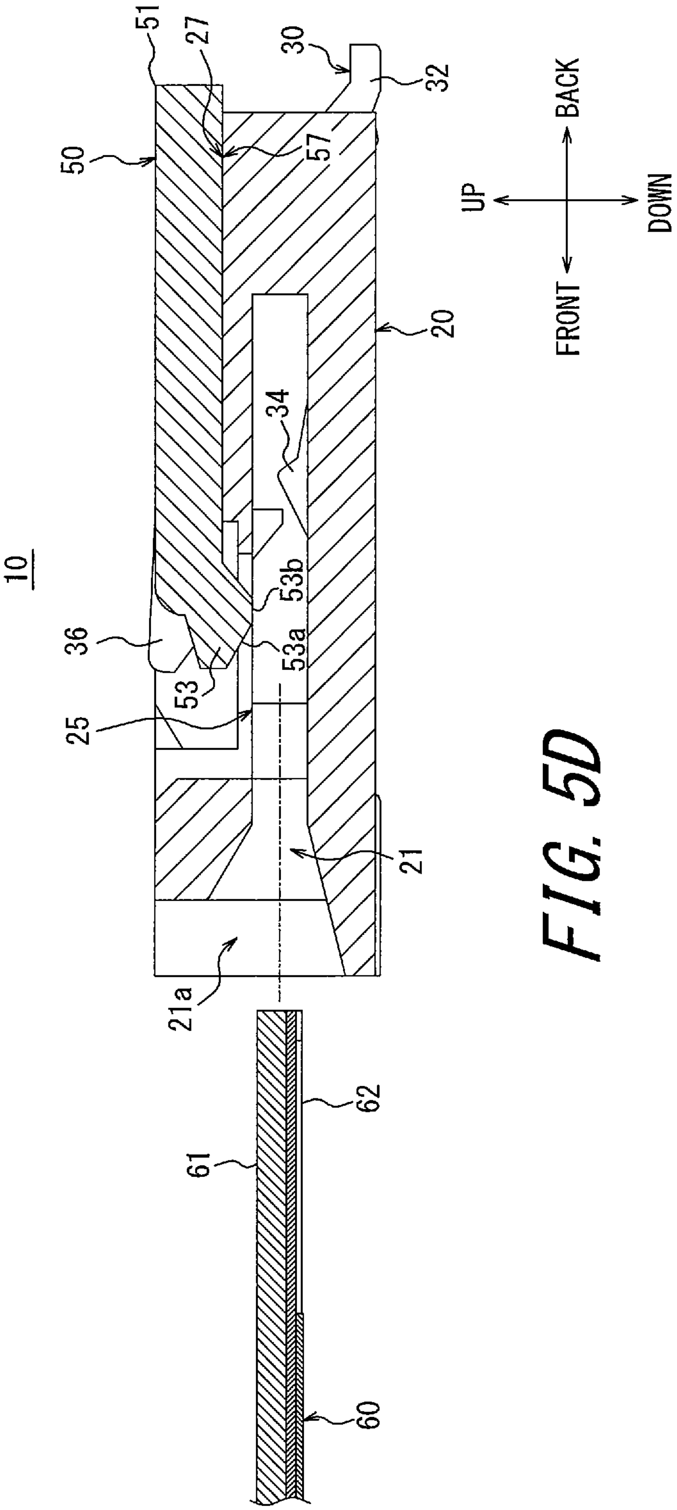
FIG. 5D is a sectional view along arrow D-D in FIG. 1.

FIG. 5A is a sectional view along arrow A-A in FIG. 1. FIG. 5B is a sectional view along arrow B-B in FIG. 1. FIG. 5C is a sectional view along arrow C-C in FIG. 1. FIG. 5D is a sectional view along arrow D-D in FIG. 1. FIGS. 5A to 5D are each a sectional view illustrating a state before the connection object 60 is inserted into the insertion groove 21 of the connector 10. The functions of the components in the connector 10 will be mainly described below, with reference to FIGS. 5A to 5D.

With reference to FIG. 5C, the plurality of contacts 30 are press-fitted into the respective plurality of first installation grooves 22. Here, the first elastic portion 33 of each contact 30 is elastically deformable in the up-down direction. When the contact 30 is in a free state of not being elastically deformed, the contact portion 34 of the contact 30 protrudes upward from the first installation groove 22 and is located inside the insertion groove 21. With reference to FIG. 5D, too, the contact portion 34 of the contact 30 is located backward from the support portion 53 of the actuator 50 in the front-back direction.

The contact 30 is in contact with the actuator 50 in a state of being press-fitted into the insulator 20 from behind. More specifically, the cam portion 52 of the actuator 50 is in contact with the engaging portion 36 of the contact 30. As a result of the cam portion 52 being pressed by the contact 30 from above, the actuator 50 is rotatable between a lock position in which the actuator 50 is closed and an unlock position in which the actuator 50 is open with respect to the insulator 20.

Here, the arm portion 35 of the contact 30 biases the actuator 50 toward the lock position. More specifically, when the contact 30 is attached to the actuator 50, the second elastic portion 35*a* of the arm portion 35 slightly elastically deforms upward. Hence, a downward biasing force is exerted on the cam portion 52 of the actuator 50 via the engaging portion 36 of the contact 30. The whole cam portion 52 is approximately fan-shaped in cross section and its part with a tapered shape is in contact with the engaging portion 36 in the up-down direction, so that the biasing force toward the lock position is effectively transmitted from the engaging portion 36 to the cam portion 52. The cam portion 52 is subjected to the biasing force from the engaging portion 36 in any form such as point contact, line contact, or surface contact. On the other hand, as a result of the second elastic portion 35*a* further elastically deforming, the arm portion 35 allows the actuator 50 to rotate toward the unlock position.

When the actuator 50 is in the lock position, at least part of the arm portion 35 of the contact 30 is contained in the receiving groove 56 of the actuator 50. More specifically, the arm portion 35 is contained in the receiving groove 56 except the part exposed to the outside from the receiving groove 56 by the elastic deformation of the second elastic portion 35*a*.

In the connector 10 according to the embodiment, when the actuator 50 changes from the lock position to the unlock position, the actuator 50 rotates from the insertion side to the removal side with respect to the insulator 20. When the actuator 50 changes from the lock position to the unlock position, the actuator 50 rotates counterclockwise in FIGS. 5A to 5D.

With reference to FIG. 5A, the metal fitting 40 is attached to the insulator 20 as a result of the latch 42 being press-fitted into the second installation groove 23 of the insulator 20. When the actuator 50 is attached to the contacts 30, the pressed portion 54 of the actuator 50 engages with the pressing portion 44 of the metal fitting 40. As a result of the pressed portion 54 being pressed by the pressing portion 44 from above, the actuator 50 is prevent from coming off upward during rotation.

When the actuator 50 is in the lock position, the lock position regulated portion 57 of the actuator 50 is in contact with or close to the lock position regulating portion 27 of the insulator 20. Thus, the lock position regulating portion 27 applies, to the actuator 50, a reaction that is balanced with the biasing force toward the lock position exerted on the actuator 50 from the contact 30. The lock position regulating portion 27 serves to define the lock position of the actuator 50 and regulate the actuator 50 so as not to rotate excessively beyond the lock position.

With reference to FIG. 5B, when the actuator 50 is in the lock position, the locking portion 55 passes through the second through hole 26 and protrudes into the insertion groove 21 of the insulator 20. The outer surface of the locking portion 55 on the removal side includes an inclined surface 55*a* inclined obliquely downward from the removal side to the insertion side.

With reference to FIG. 5D, the support portion 53 of the actuator 50 is located more on the cam portion 52 side than the insertion groove 21 of the insulator 20, in the lock position of the actuator 50. When the actuator 50 is in the lock position, the support portion 53 does not protrude into the insertion groove 21. The outer surface of the support portion 53 on the removal side includes a support surface 53*a* inclined obliquely downward from the removal side to the insertion side. The support surface 53*a* is a flat surface. The support portion 53 has a notch 53*b* in one part so as not to protrude into the insertion groove 21 when the actuator 50 is in the lock position. The notch 53*b* is formed continuously with the support surface 53*a*.

Figure 6:
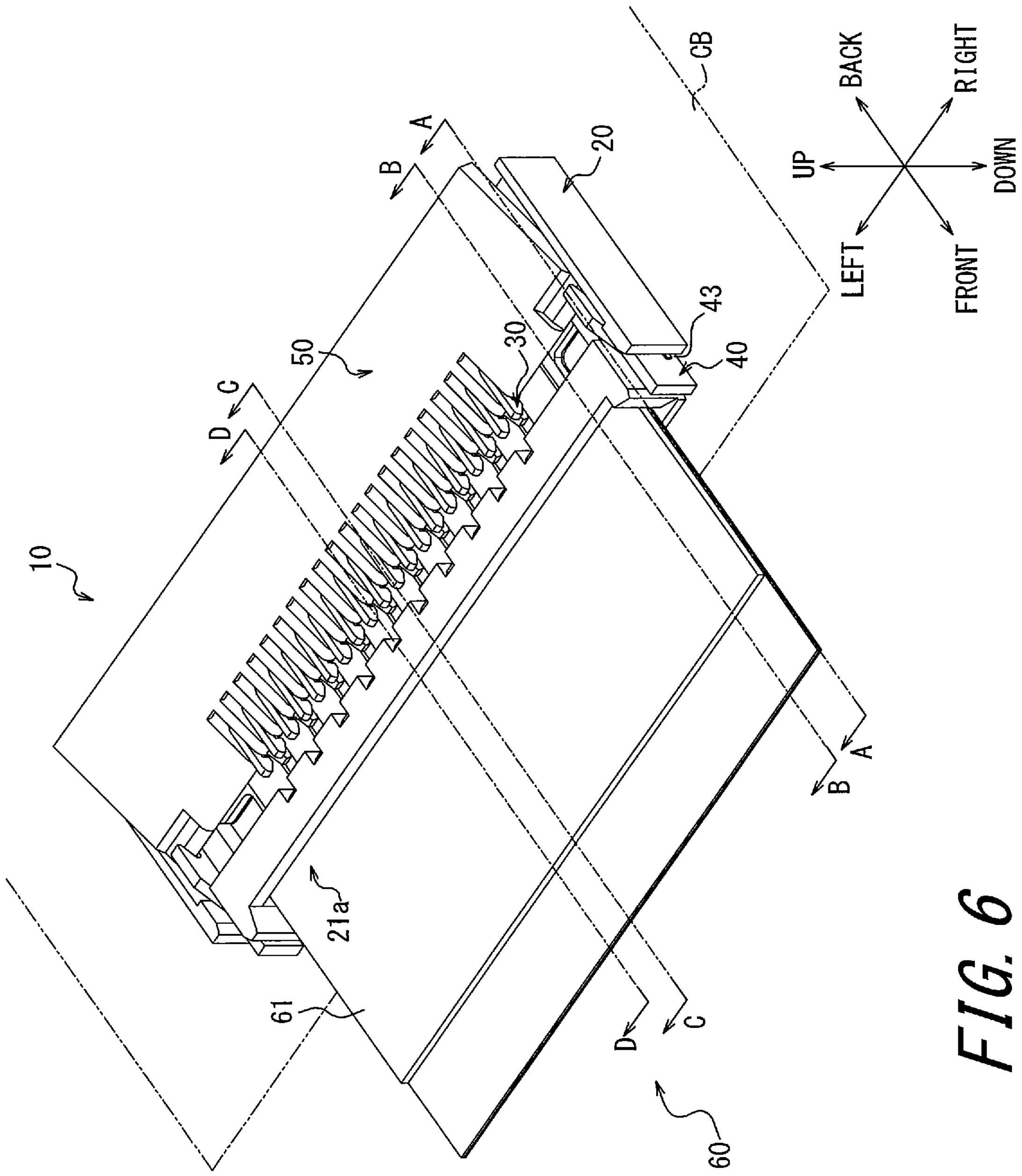
FIG. 6 is a perspective top view illustrating a state when the connection object is inserted into the connector in FIG. 1.
Figure 7A:
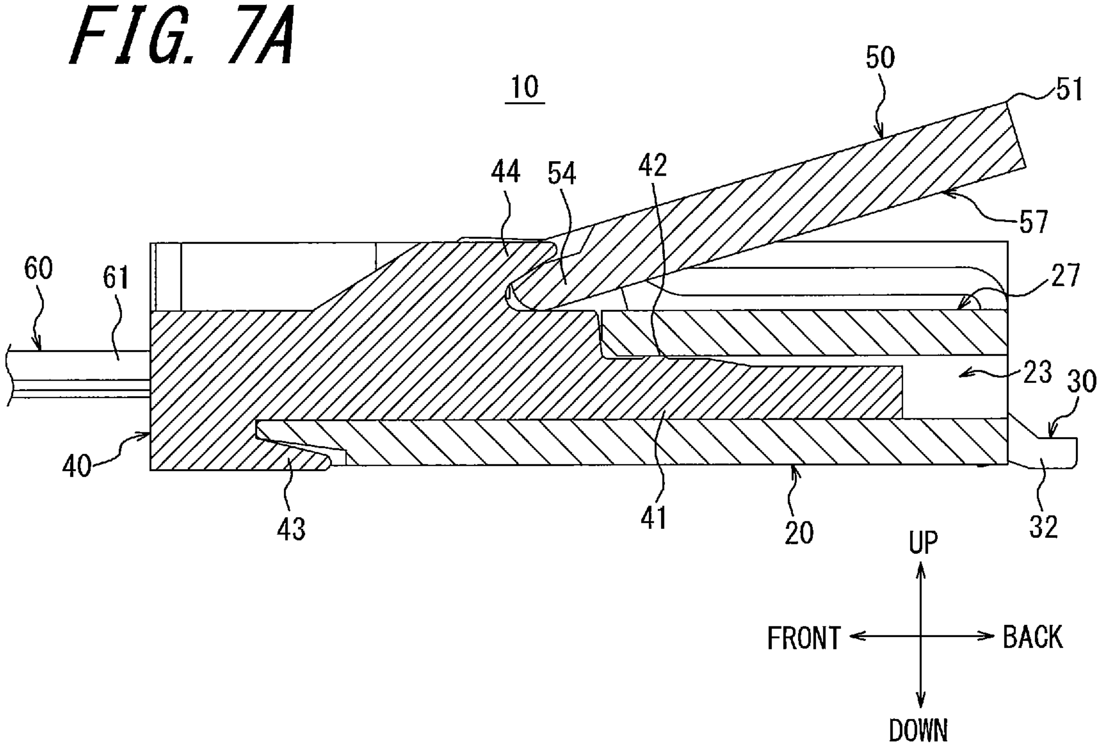
FIG. 7A is a sectional view along arrow A-A in FIG. 6.
Figure 7B:
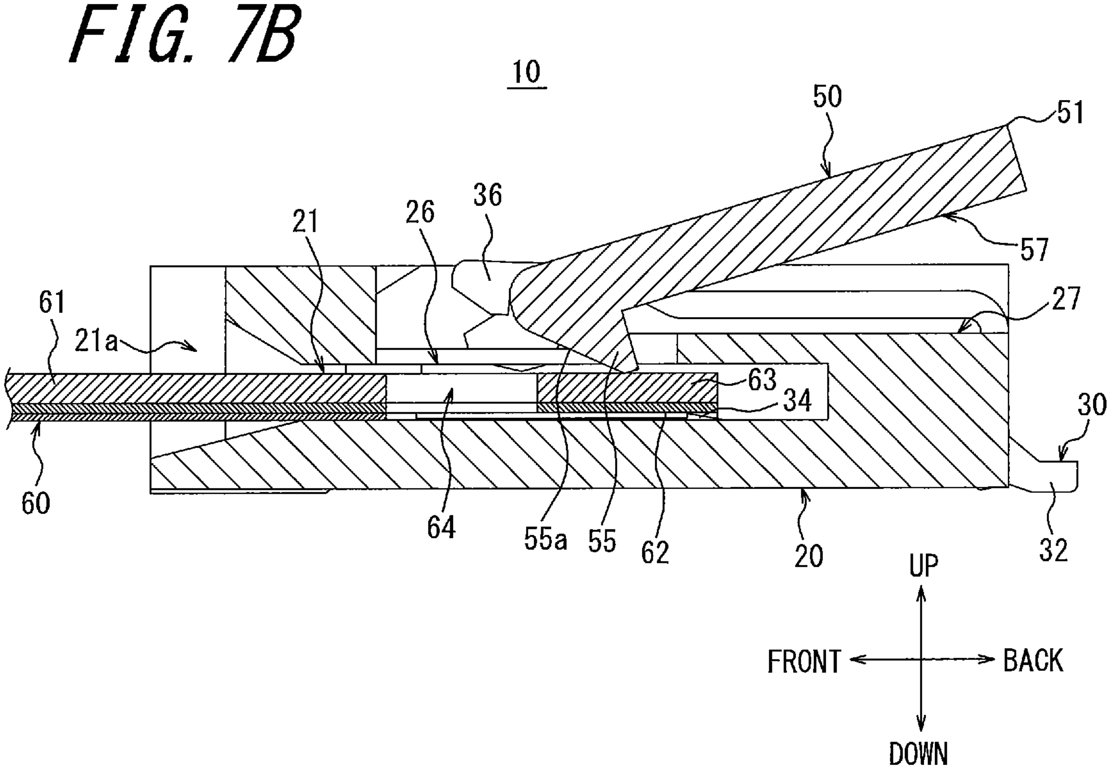
FIG. 7B is a sectional view along arrow B-B in FIG. 6.
Figure 7C:
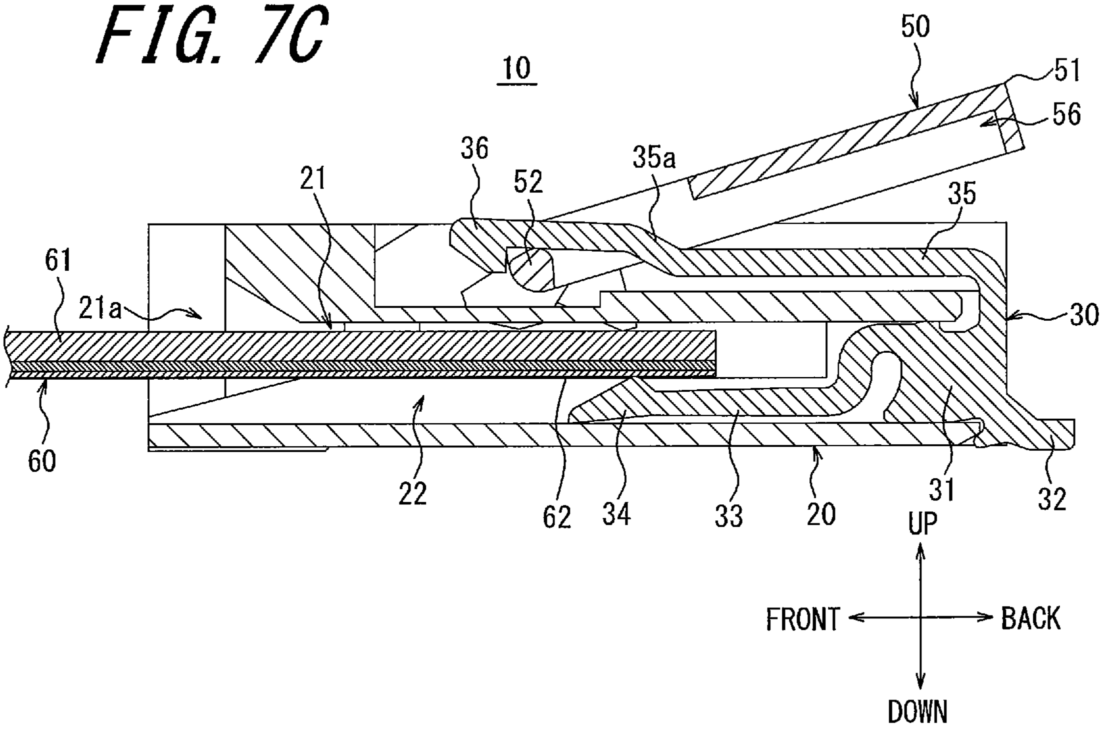
FIG. 7C is a sectional view along arrow C-C in FIG. 6.
Figure 7D:
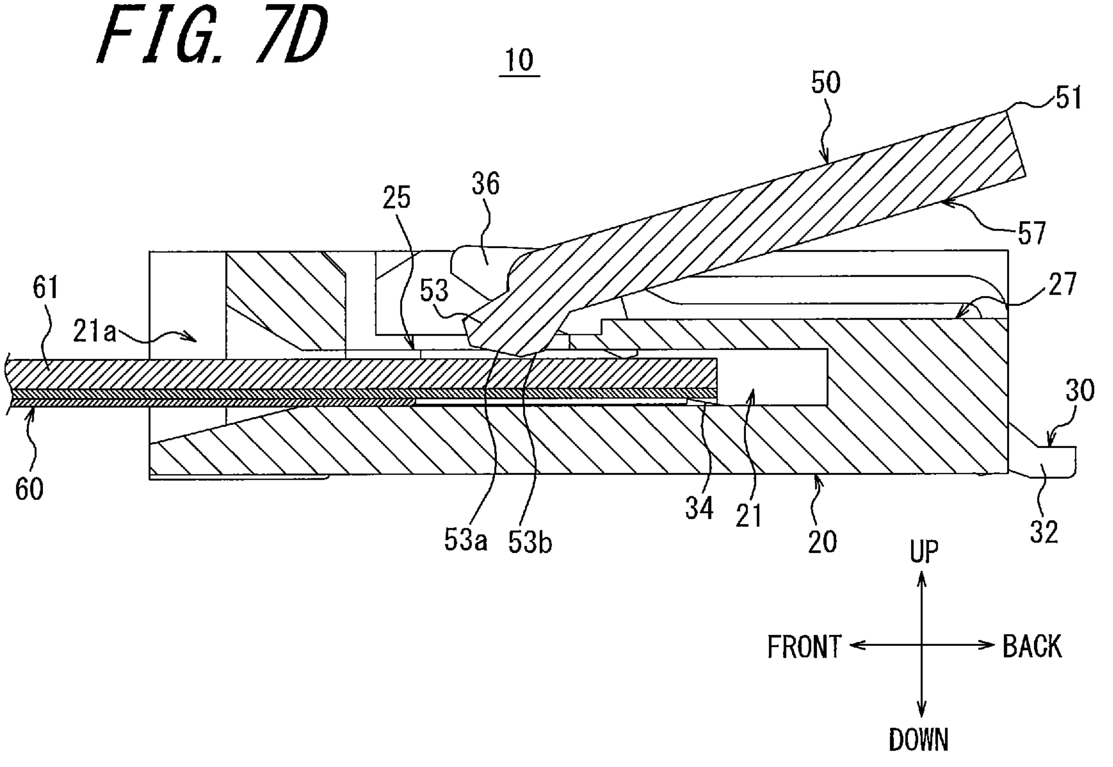
FIG. 7D is a sectional view along arrow D-D in FIG. 6.

FIG. 6 is a perspective top view illustrating a state when the connection object 60 is inserted into the connector 10 in FIG. 1. FIG. 7A is a sectional view along arrow A-A in FIG. 6. FIG. 7B is a sectional view along arrow B-B in FIG. 6. FIG. 7C is a sectional view along arrow C-C in FIG. 6. FIG. 7D is a sectional view along arrow D-D in FIG. 6. FIGS. 7A to 7D are each a sectional view illustrating a state when the connection object 60 is inserted into the insertion groove 21 of the connector 10. The functions of the components in the connector 10 will be described below, mainly with reference to FIGS. 6 and 7A to 7D.

With reference to FIGS. 1 and 6, when the connection object 60 is inserted into the connector 10, the tip part of the reinforcement portion 61 of the connection object 60 enters into the insertion groove 21 from the opening 21*a* of the insertion groove 21. Here, even if the insertion position of the connection object 60 slightly deviates from the insertion groove 21 in the right-left direction, the guide portions 65 of the connection object 60 come into contact with the respective right and left inclined surfaces of the insertion groove 21 forming the tapered shape of the opening 21*a*. The guide portions 65 slide on the right and left inclined surfaces of the insertion groove 21, and thus the connection object 60 is guided into the insertion groove 21.

Likewise, with reference to FIG. 7B, even if the insertion position of the connection object 60 slightly deviates from the insertion groove 21 in the up-down direction or the connection object 60 is slightly inclined in the up-down direction from the insertion/removal direction, the tip part of the reinforcement portion 61 of the connection object 60 comes into contact with the upper and lower inclined surfaces of the insertion groove 21 forming the tapered shape of the opening 21*a*. The tip part of the reinforcement portion 61 slides on the upper and lower inclined surfaces of the insertion groove 21, and thus the connection object 60 is guided into the insertion groove 21.

When the connection object 60 moves further toward the insertion side of the insertion groove 21, the contact portion 63 of the connection object 60 comes into contact with the locking portion 55 of the actuator 50. Because the outer surface of the locking portion 55 on the removal side includes the inclined surface 55*a*, the reaction toward the unlock position of the actuator 50 is generated as a result of the contact between the locking portion 55 and the connection object 60, as mentioned above. This causes the moment of force on the actuator 50 toward the unlock position.

With reference to FIG. 7C, too, when the connection object 60 further moves toward the insertion side of the insertion groove 21 in a state in which the locking portion 55 and the contact portion 63 are in contact with each other, the actuator 50 rotates toward the unlock position by the moment of force toward the unlock position, and stops in a half-unlock position. As a result of the actuator 50 rotating toward the unlock position, the second elastic portion 35*a* of the contact 30 further elastically deforms, and the biasing force toward the lock position is exerted more strongly on the actuator 50 from the arm portion 35 via the cam portion 52.

Consequently, the locking portion 55 of the actuator 50 rides onto the upper surface of the contact portion 63 of the connection object 60, and is pressed downward against the contact portion 63 by the biasing force toward the lock position. As a result of the biasing force toward the lock position and the reaction from the contact portion 63 balancing with each other, the actuator 50 maintains the half-unlock position. As the connection object 60 moves toward the insertion side, the contact portion 63 slides over the lower end of the locking portion 55.

With reference to FIG. 7C, the lower surface of the signal line 62 of the connection object 60 is in contact with the contact portion 34 of the contact 30, and elastically deforms the first elastic portion 33 of the contact 30 toward the inside of the first installation groove 22.

With reference to FIG. 7A, when the actuator 50 rotates between the lock position and the unlock position, the pressed portion 54 of the actuator 50 is in contact with the front half part of the base portion 41 of the metal fitting 40. Hence, the pressed portion 54 is supported by the upper surface of the front half part of the base portion 41 and the cam portion 52 is pressed by the contact 30 from above, so that the actuator 50 can stably rotate between the lock position and the unlock position with respect to the insulator 20.

With reference to FIG. 7D, when the actuator 50 is in the half-unlock position, part of the support portion 53 passes through the first through hole 25 and slightly protrudes into the insertion groove 21 of the insulator 20. Even in such a case, the support portion 53 and the connection object 60 are separate from each other. Since the connection object 60 is not in contact with the support portion 53 even when the actuator 50 is in the half-unlock position, workability when inserting the connection object 60 is improved. For example, damage or cut of the support portion 53 or the connection object 60 caused by the support portion 53 and the connection object 60 coming into contact with each other is suppressed.

Figure 8:
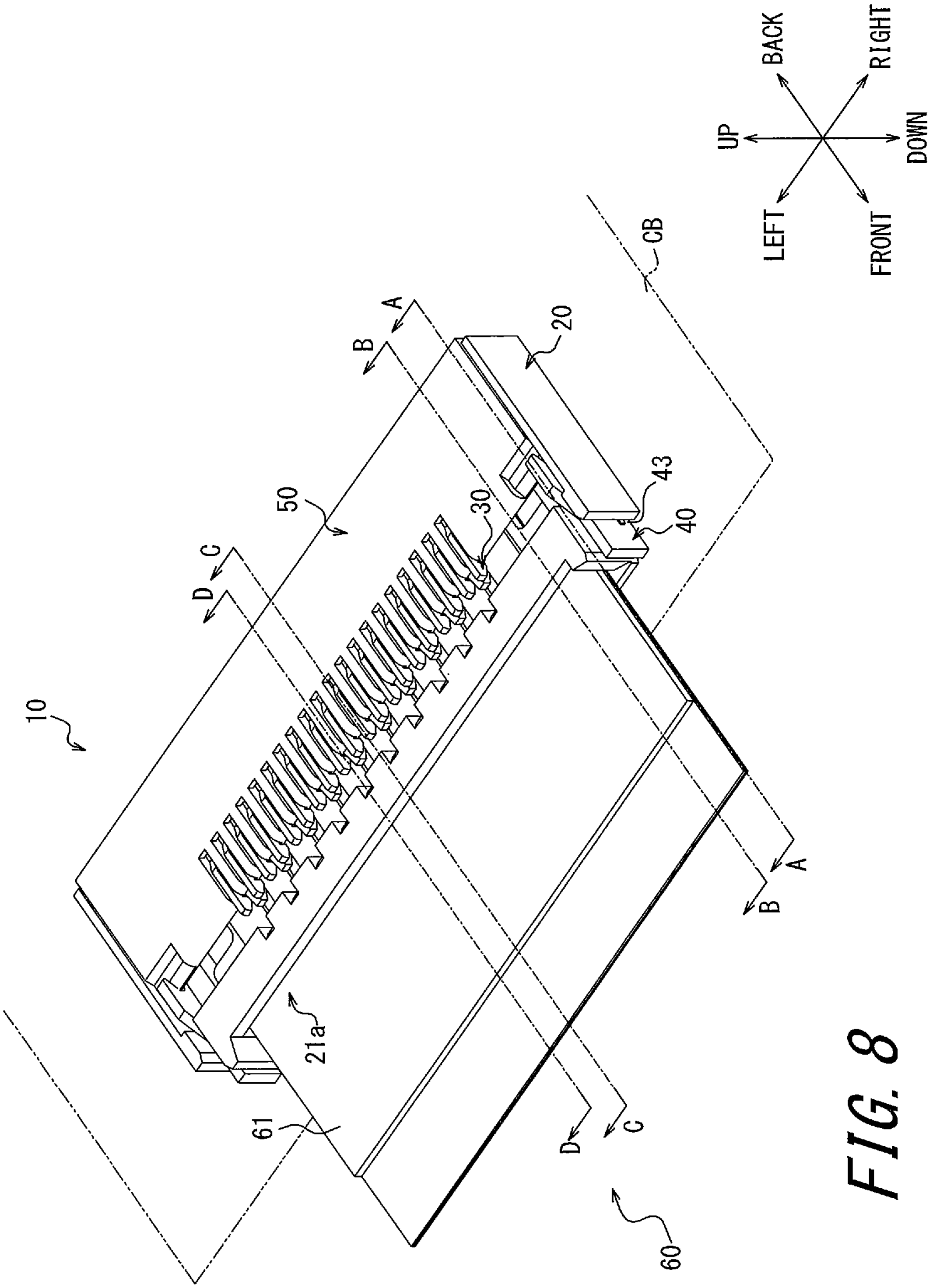
FIG. 8 is a perspective top view illustrating a state in which the connection object is completely inserted in the connector in FIG. 1.
Figure 9A:
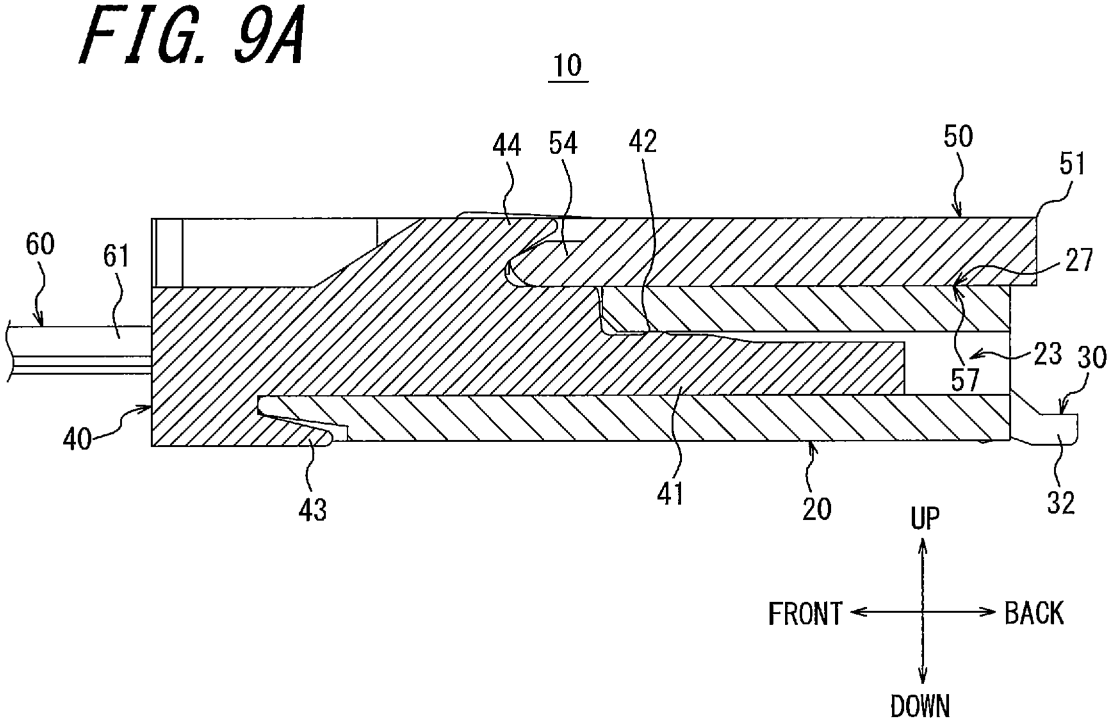
FIG. 9A is a sectional view along arrow A-A in FIG. 8.
Figure 9B:
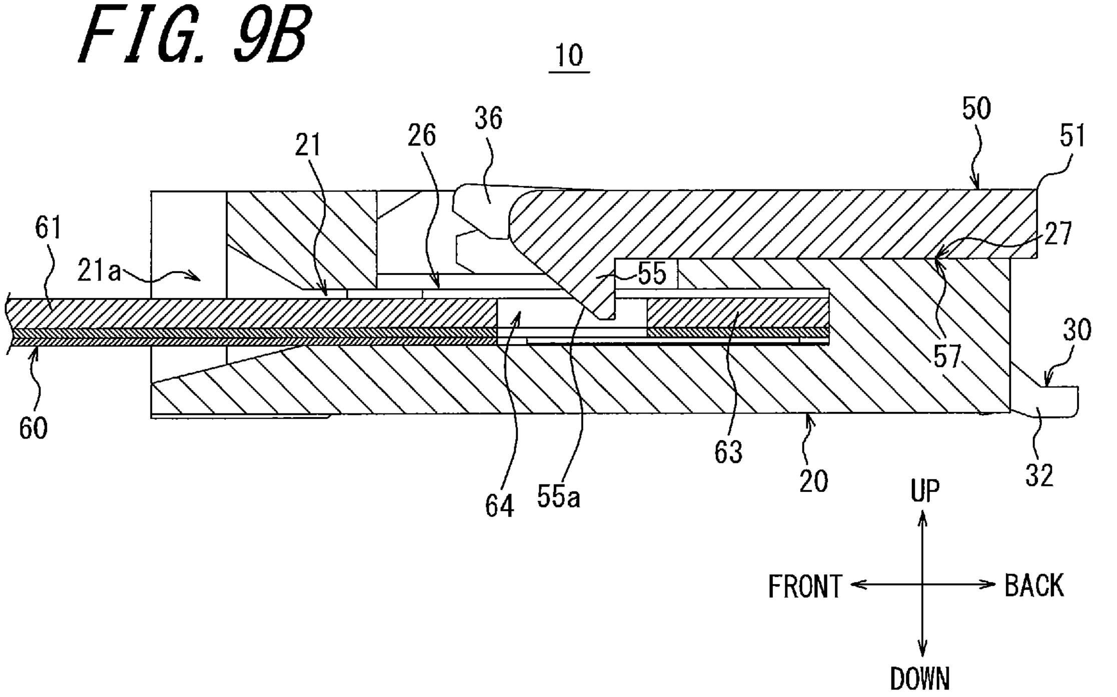
FIG. 9B is a sectional view along arrow B-B in FIG. 8.
Figure 9C:
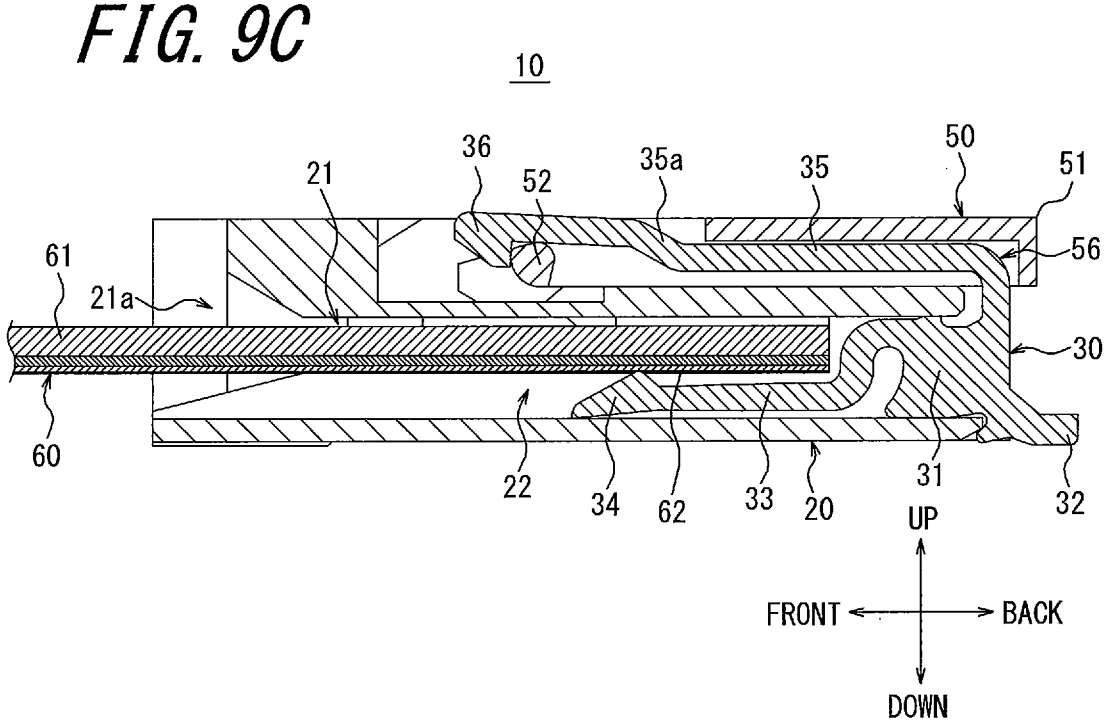
FIG. 9C is a sectional view along arrow C-C in FIG. 8.
Figure 9D:
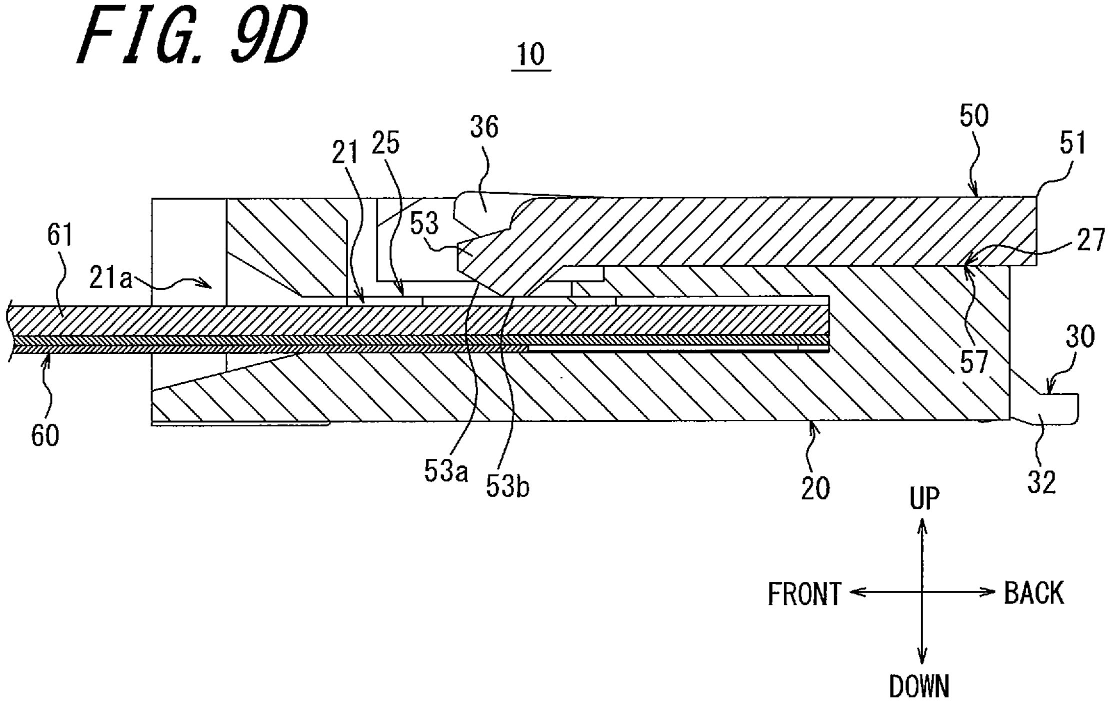
FIG. 9D is a sectional view along arrow D-D in FIG. 8.

FIG. 8 is a perspective top view illustrating a state in which the connection object 60 is completely inserted in the connector 10 in FIG. 1. FIG. 9A is a sectional view along arrow A-A in FIG. 8. FIG. 9B is a sectional view along arrow B-B in FIG. 8. FIG. 9C is a sectional view along arrow C-C in FIG. 8. FIG. 9D is a sectional view along arrow D-D in FIG. 8. FIGS. 9A to 9D are each a sectional view illustrating a state in which the connection object 60 is completely inserted in the insertion groove 21 of the connector 10. The functions of the components in the connector 10 will be mainly described below, with reference to FIGS. 8 and 9A to 9D.

With reference to FIG. 9B, when the connection object 60 is completely inserted in the insertion groove 21, the contact portion 63 of the connection object 60 passes the locking portion 55 of the actuator 50 and is contained inside the insertion groove 21. The locking portion 55 is inserted into the locked portion 64 of the connection object 60 from above. More specifically, the locking portion 55 and the contact portion 63 come out of contact with each other, and the actuator 50 automatically changes to the lock position by the biasing force from the contact 30.

In the lock position, the locking portion 55 of the actuator 50 engages with the locked portion 64 of the connection object 60 inserted in the insertion groove 21. The connection object 60 is held in the insertion groove 21 by the engagement between the locking portion 55 and the locked portion 64 so as not to come off. In such a state, even if an attempt is made to forcibly remove the connection object 60, the contact portion 63 of the connection object 60 comes into contact with the inner surface of the locking portion 55, so that the connection object 60 is held more effectively so as not to come off.

Thus, the connector 10 holds the connection object 60 so as not to come off with only a single operation of inserting the connection object 60, with no need for any operation on the actuator 50 by an operator, assembling equipment, or the like.

With reference to FIG. 9C, the signal line 62 of the connection object 60 is in contact with the contact portion 34, in a state in which the first elastic portion 33 of the contact 30 elastically deforms toward the inside of the first installation groove 22. Hence, the connection object 60 and the circuit board CB are electrically connected to each other via the contact 30.

Figure 10:
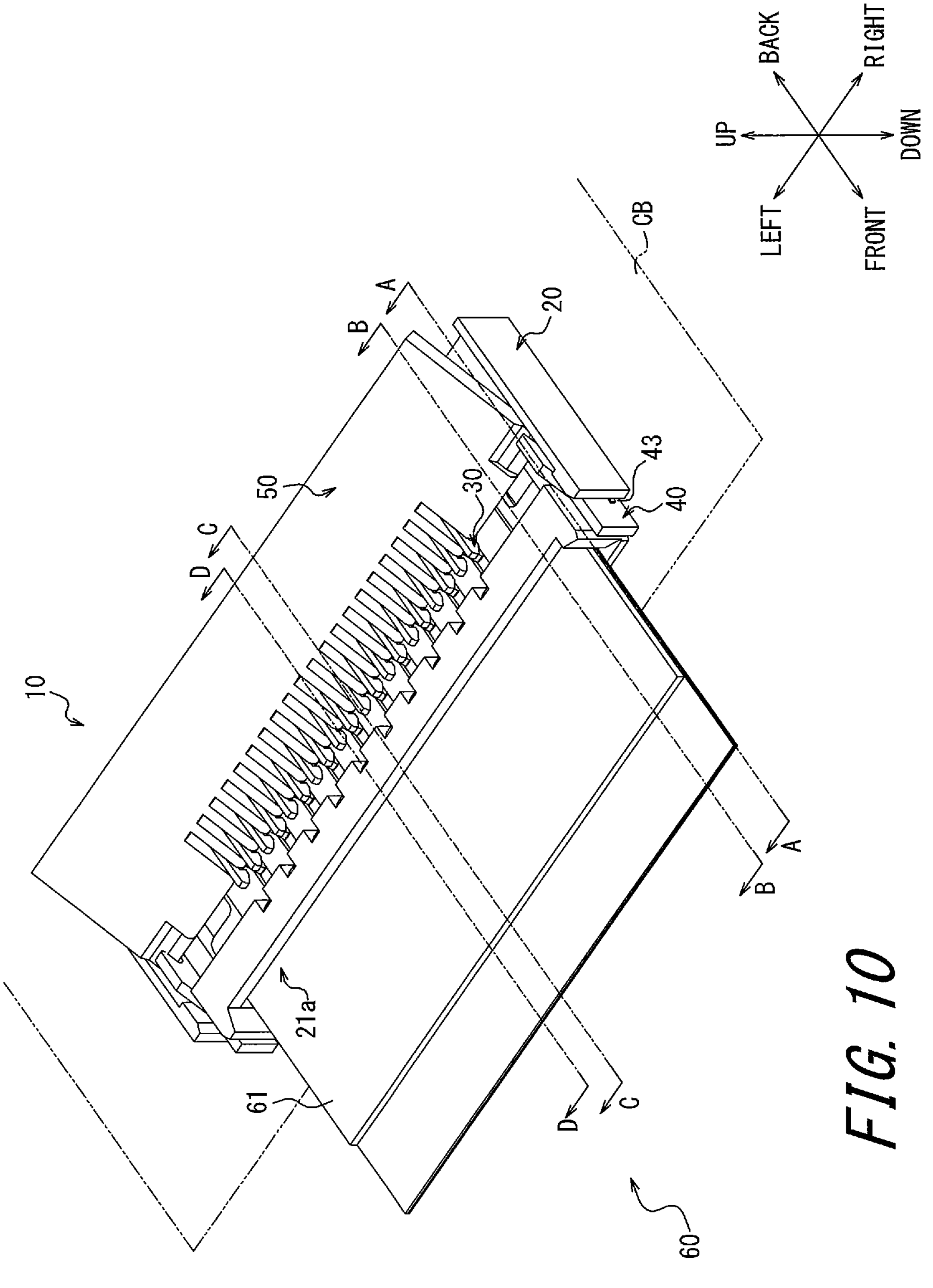
FIG. 10 is a perspective top view illustrating a state when the connection object begins to be removed from the connector in FIG. 1.

FIG. 10 is a perspective top view illustrating a state when the connection object 60 begins to be removed from the connector 10 in FIG. 1.

Figure 11A:
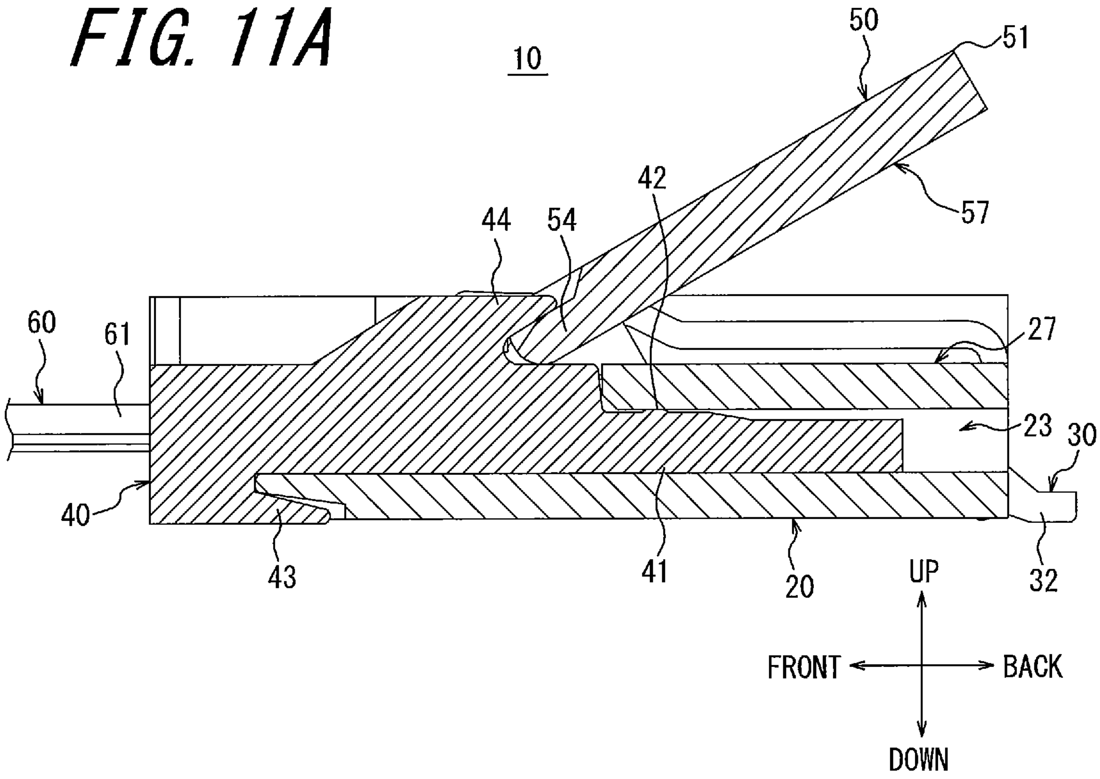
FIG. 11A is a sectional view along arrow A-A in FIG. 10.
Figure 11B:
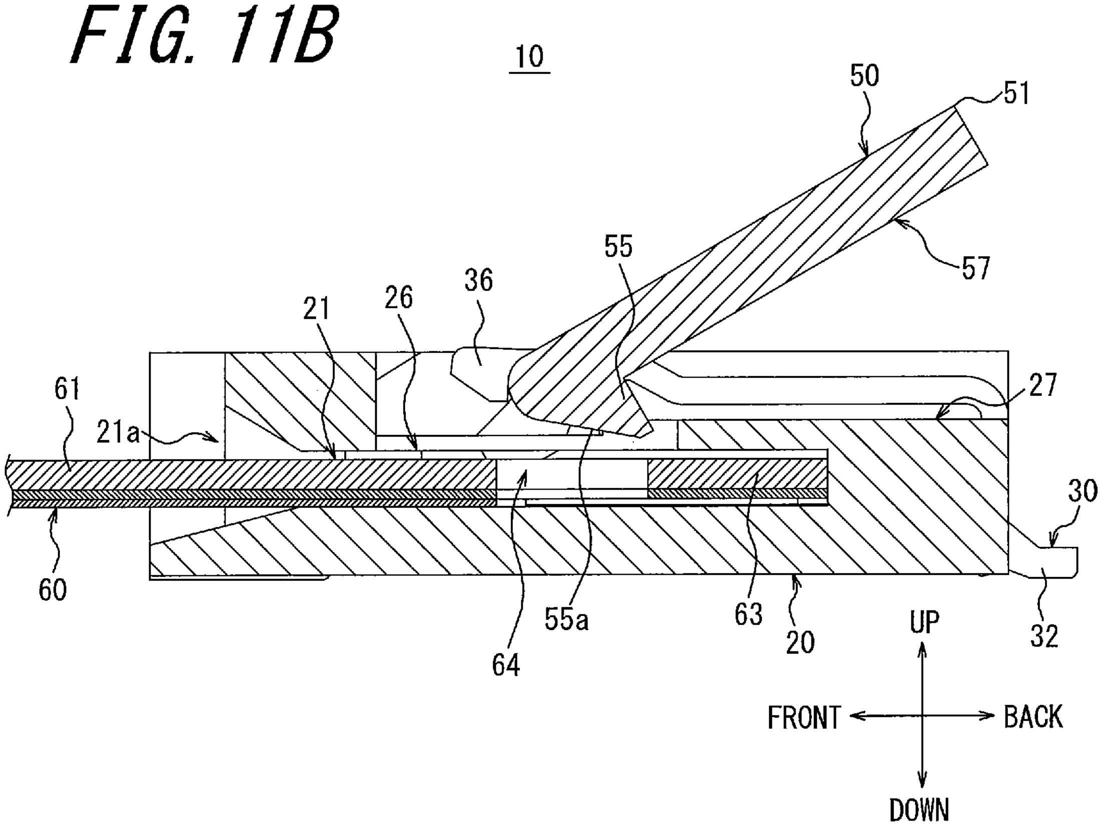
FIG. 11B is a sectional view along arrow B-B in FIG. 10.
Figure 11C:
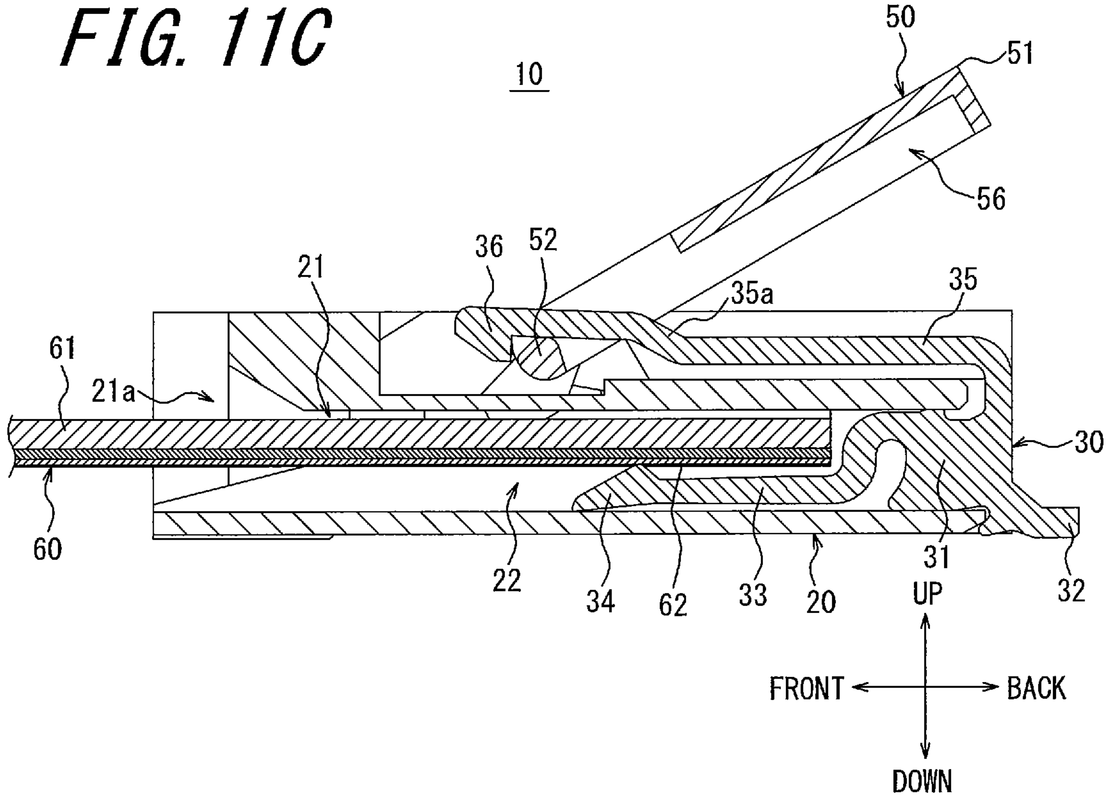
FIG. 11C is a sectional view along arrow C-C in FIG. 10.
Figure 11D:
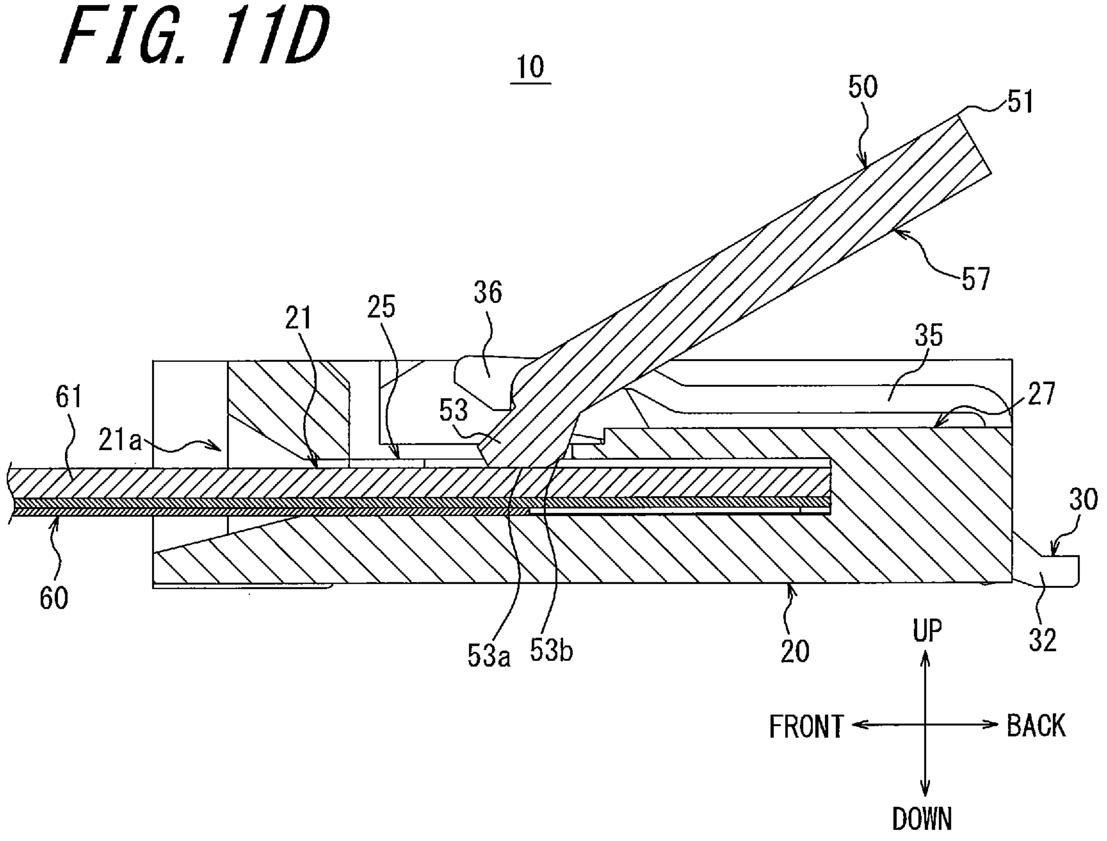
FIG. 11D is a sectional view along arrow D-D in FIG. 10.

FIG. 11A is a sectional view along arrow A-A in FIG. 10. FIG. 11B is a sectional view along arrow B-B in FIG. 10. FIG. 11C is a sectional view along arrow C-C in FIG. 10. FIG. 11D is a sectional view along arrow D-D in FIG. 10. FIGS. 11A to 11D are each a sectional view illustrating a state when the connection object 60 begins to be removed from the insertion groove 21 of the connector 10. The functions of the components in the connector 10 will be mainly described below, with reference to FIGS. 10 and 11A to 11D In the connector 10, in a state in which the connection object 60 is completely inserted in the insertion groove 21, an operator, assembling equipment, or the like operates the operation portion 51 of the actuator 50 to rotate the actuator 50 to the unlock position. The operation portion 51 is thus subjected to the operation of rotating the actuator 50 to the unlock position by the operator, assembling equipment, or the like.

With reference to FIG. 11C, since the actuator 50 is in the unlock position, the second elastic portion 35*a* of the contact 30 elastically deforms greatly, and the biasing force toward the lock position is exerted on the actuator 50 from the arm portion 35 via the cam portion 52. Here, the tip part of the cam portion 52 with a tapered shape in cross section supports the arm portion 35 of the contact 30 from below. Hence, the biasing force of the contact 30 toward the lock position is more effectively transmitted from the engaging portion 36 to the cam portion 52.

With reference to FIG. 11D, when the actuator 50 is in the unlock position, the support portion 53 of the actuator 50 is in contact with the connection object 60 inserted in the insertion groove 21, on the side opposite to the cam portion 52 in the up-down direction. More specifically, in the unlock position, the support portion 53 passes through the first through hole 25 and protrudes into the insertion groove 21 of the insulator 20. At least part of the support portion 53 is located inside the insertion groove 21. In this case, the support surface 53*a* of the support portion 53 is approximately parallel to the insertion/removal direction. The support surface 53*a* approximately parallel to the insertion/removal direction is in contact with the upper surface of the reinforcement portion 61 of the connection object 60 inserted in the insertion groove 21.

As a result of the biasing force exerted on the actuator 50 from the arm portion 35 of the contact 30 via the cam portion 52 and the reaction exerted on the actuator 50 from the upper surface of the reinforcement portion 61 of the connection object 60 via the support portion 53 balancing with each other, the moment of force is canceled out. Consequently, the rotation of the actuator 50 is suppressed, and the actuator 50 independently maintains the unlock position. To cancel out the moment of force and suppress the rotation of the actuator 50 effectively, the contact part between the engaging portion 36 and the cam portion 52 and the contact part between the reinforcement portion 61 and the support portion 53 are approximately at the same position in the insertion/removal direction when the actuator 50 is in the unlock position. Thus, the contact parts are symmetrically arranged in the up-down direction with respect to the cam portion 52 as the axis of rotation of the actuator 50, and the front-back positions of the points of action of the biasing force and the reaction acting on the actuator 50 are approximately the same.

With reference to FIG. 11A, when the actuator 50 is in the unlock position, the pressing portion 44 of the metal fitting 40 serves to define the unlock position of the actuator 50 via the pressed portion 54 and regulate the actuator 50 so as not to rotate forward excessively beyond the unlock position. The pressing portion 44 can therefore suppress damage of each component of the actuator 50 and the like.

With reference to FIG. 11B, when the actuator 50 is in the unlock position, the locking portion 55 of the actuator 50 does not engage with the locked portion 64 of the connection object 60. In the unlock position of the actuator 50, the locking portion 55 disengages from the locked portion 64 of the connection object 60. This allows the connection object 60 to move in the removal direction without being obstructed by the locking portion 55.

With reference to FIG. 11D again, when the connection object 60 is removed in a state in which the actuator 50 is in the unlock position, the upper surface of the reinforcement portion 61 of the connection object 60 slides over the support portion 53 of the actuator 50, and then the support portion 53 and the connection object 60 come out of contact with each other. The actuator 50 automatically returns to the lock position by the biasing force from the contact 30, with the contact part between the pressed portion 54 and the front half part of the base portion 41 of the metal fitting 40 as the fulcrum.

The above-described connector 10 according to the embodiment can improve workability when removing the connection object 60. More specifically, the actuator 50 has the support portion 53 that is contact with the connection object 60 inserted in the insertion groove 21 in the unlock position, and therefore independently maintains the unlock position. In the case of a conventional connector in which the actuator cannot independently maintain the unlock position, when removing the connection object, the operator, assembling equipment, or the like needs to simultaneously perform the operation of rotating the actuator to the unlock position and maintaining the actuator in the unlock position and the operation of removing the connection object from the connector. For example, the operator needs to perform the operations with both hands. For example, the assembling equipment needs to perform the operations using two working arms. In the connector 10 according to the embodiment, the actuator 50 independently maintains the unlock position. Accordingly, the operator, assembling equipment, or the like does not need to perform the operation of maintaining the actuator 50 in the unlock position when removing the connection object 60. For example, the operator can rotate the actuator 50 to the unlock position with only one hand and then perform the operation of removing the connection object 60 from the connector 10 with the same hand. For example, the assembling equipment can rotate the actuator 50 to the unlock position using only one working arm and then perform the operation of removing the connection object 60 from the connector 10 using the same working arm.

The connector 10 according to the embodiment has a simple structure and thus can be reduced in height. The connector 10 can be miniaturized. More specifically, as a result of the actuator 50 having a mechanism of maintaining the actuator 50 in the unlock position and the contact 30 having a mechanism of biasing the actuator 50 toward the lock position, the metal fitting 40 can be reduced in height as compared with the case where the metal fitting 40 has these mechanisms. Therefore, the connector 10 as a whole can be miniaturized.

As a result of the containing portion 24 formed in the insulator 20 separating the first elastic portion 33 and the arm portion 35 in the contact 30 in the up-down direction, the elastic force of the arm portion 35 can be improved. More specifically, the arm portion 35 bends approximately in an L-shape from the latch 31 formed in the contact 30 so as not to be in contact with the containing portion 24. Since the length of the arm portion 35 can be secured, the elastic force in the up-down direction can be obtained. The reliability of contact between the engaging portion 36 and the cam portion 52 can therefore be attained.

As a result of the support surface 53*a* of the actuator 50 being a flat surface, the contact part between the support surface 53*a* and the connection object 60 is a flat surface. This enables the actuator 50 to maintain the unlock position more stably. Accordingly, the reinforcement portion 61 of the connection object 60 can easily slide on the support surface 53*a*, so that workability during removal can be further improved. Damage of the support surface 53*a* when the reinforcement portion 61 of the connection object 60 slides on the support surface 53*a* can be suppressed.

As a result of the support portion 53 being located higher than the insertion groove 21 in the lock position of the actuator 50, the connection object 60 is kept from being in contact with the support portion 53 when the connection object 60 is inserted into the insertion groove 21. This improves workability when inserting the connection object 60. Damage such as cut of the actuator 50 caused by contact with the connection object 60 can be suppressed.

As a result of the actuator 50 having the locking portion 55, the connector 10 can stably hold the connection object 60 in the lock position of the actuator 50. When the actuator 50 is in the unlock position, the locking portion 55 does not engage with the locked portion 64 of the connection object 60. Accordingly, the operator, assembling equipment, or the like can easily remove the connection object 60. This improves workability when removing the connection object 60.

Since the actuator 50 rotates and returns to the lock position automatically after the connection object 60 is removed from the insulator 20, the operator, assembling equipment, or the like does not need to perform the operation of returning the actuator 50 to the lock position. For example, after rotating the actuator 50 to the unlock position with one hand, the operator can return the actuator 50 to the lock position simply by performing the operation of removing the connection object 60 from the connector 10. For example, after rotating the actuator 50 to the unlock position using one working arm, the assembling equipment can return the actuator 50 to the lock position simply by performing the operation of removing the connection object 60 from the connector 10.

Since the connection object 60 is held by the locking portion 55 so as not to come off simply by a single operation of inserting the connection object 60, the connector 10 can improve workability not only when removing the connection object 60 but also when inserting the connection object 60. When inserting the connection object 60, the operator, assembling equipment, or the like does not need to perform the operation of rotating the actuator 50 to the unlock position and maintaining the position. For example, the operator can perform the operation of inserting the connection object 60 into the connector 10 with one hand. For example, the assembling equipment can perform the operation of inserting the connection object 60 into the connector 10 using only one working arm.

With the synergistic effect of the tapered shape of the opening 21*a* of the insulator 20 and the guide portion 65 of the connection object 60, workability when inserting the connection object 60 into the connector 10 can be improved.

It is to be understood by a person of ordinary skill in the art that the presently disclosed techniques may also be realized in specific forms other than the foregoing embodiment without departing from the technical spirit or essential features of the present disclosure. Therefore, the above description is illustrative and not restrictive. The scope of the present disclosure is defined by the accompanying claims rather than by the above description. Amongst all modifications, those falling within the corresponding equivalent scope are encompassed within the scope of the present disclosure.

For example, the shape, position, orientation, and number of each component described above are not limited to those in the above description and the illustration in the drawings. The shape, position, orientation, and number of each component may be freely set as long as its functions can be achieved.

The method of assembling the connector 10 is not limited to the foregoing method. The method of assembling the connector 10 may be any method with which each function can be achieved. For example, the contacts 30 and the metal fittings 40 may be integrally formed with the insulator 20 by insert molding, instead of press fitting.

Although the above describes the case where the support portions 53 are formed each between a pair of cam portions 52 throughout the arrangement region of the contacts 30, the support portions 53 are not limited to such. The support portions 53 may be formed at any position that can maintain the actuator 50 in the unlock position. For example, the support portions 53 may be formed in the actuator 50 in a region that includes not only the arrangement region of the contacts 30 but also the right and left outer sides of the arrangement region of the contacts 30. For example, the support portions 53 may be formed in the actuator 50 in a region that includes only the right and left outer sides of the arrangement region of the contacts 30. For example, the support portions 53 may be formed in the actuator 50 in a region that includes only the right and left ends of the arrangement region of the contacts 30. In this case, if the number of poles of the connector 10 decreases and the number of contacts 30 decreases, the right-left width of the connector 10 can be reduced more effectively. Accordingly, the connector 10 can improve workability when removing the connection object 60 while maintaining its compactness in the case where the number of poles is small.

Although the above describes the case where the support surface 53*a* of each support portion 53 is a flat surface, the support surface 53*a* is not limited to such. The support surface 53*a* may have any structure that can maintain the actuator 50 in the unlock position. For example, the support surface 53*a* may not be a flat surface. The support surface 53*a* may have a plurality of projections and recesses. The support surface 53*a* may be a curved surface.

Although the above describes the case where the contacts 30 are press-fitted into the insulator 20 from behind and arranged in the right-left direction, the method of arranging the contacts 30 is not limited to such. The contacts 30 may be arranged in any form according to the arrangement of the signal lines 62 of the connection object 60. For example, the contacts 30 may be press-fitted into the insulator 20 alternately from front and from behind and arranged in the right-left direction.

Although the above describes the case where the upper part of each contact 30 is received in the containing portion 24 of the insulator 20 and exposed from the insulator 20, the placement of the contact 30 is not limited to such. The whole contact 30 including its upper part may be surrounded by the insulator 20. This can prevent electric failures, such as a short-circuit, caused by external foreign matter adhering to the contact 30.

Although the above describes the case where the contact portion 34 of each contact 30 is located backward from the support portion 53 of the actuator 50 in the front-back direction as illustrated in FIGS. 11C and 11D as an example, the formation position of the contact portion 34 is not limited to the illustration. The contact portion 34 is formed either at approximately the same front-back position as the support portion 53 or at any position backward from this front-back position. In this way, when removing the connection object 60, the actuator 50 stably maintains the unlock position.

The above-described connector 10 is mounted in an electronic device. Examples of the electronic device include any information devices such as a personal computer, a copier, a printer, a facsimile machine, and a multifunction machine. Examples of the electronic device include any acoustic video devices such as a liquid crystal television, a recorder, a camera, and headphones. Examples of the electronic device include any on-vehicle devices such as a camera, a radar, a drive recorder, and an engine control unit. Examples of the electronic device include any on-vehicle devices used in vehicle-mounted systems such as a car navigation system, an advanced driving support system, and a security system. Examples of the electronic device include any industrial devices.

By the effects of the connector 10 in workability improvement and miniaturization, workability when assembling the electronic device can be improved and also the electronic device can be miniaturized. The use of the connector 10 enables miniaturization of the electronic device, and eases work during production, maintenance, and the like of the electronic device even in a state in which the electronic device is miniaturized.

REFERENCE SIGNS LIST

10 connector
20 insulator
21 insertion groove
21*a* opening
22 first installation groove
23 second installation groove
24 containing portion
25 first through hole
26 second through hole
27 lock position regulating portion
30 contact
31 latch
32 mounted portion
33 first elastic portion
34 contact portion
35 arm portion
35*a* second elastic portion
36 engaging portion
40 metal fitting
41 base portion
42 latch
43 mounted portion
44 pressing portion
50 actuator
51 operation portion
52 cam portion
53 support portion
53*a* support surface
54 pressed portion
55 locking portion
55*a* inclined surface
56 receiving groove
57 lock position regulated portion
60 connection object
61 reinforcement portion
62 signal line
63 contact portion

64 locked portion
65 guide portion
CB circuit board

The invention claimed is:

1. A connector, comprising:

an insulator having an insertion groove into and from which a connection object is insertable and removable;

an actuator configured to rotate between an unlock position in which said connection object is insertable and removable and a lock position in which said actuator presses said connection object, with respect to said insulator; and a contact held by said insulator and configured to be in contact with said connection object, wherein said contact includes:

a first elastic portion configured to be in contact with said connection object; and a second elastic portion configured to engage with a cam portion formed in said actuator and bias said actuator toward said lock position, said actuator includes:

an operation portion configured to be operated toward said unlock position; and a support portion protruding more in a direction opposite to said operation portion than said cam portion, and said support portion has a support surface configured to, in said unlock position, be in contact with said connection object inserted in said insertion groove to be subjected to a reaction from said connection object that balances with a biasing force exerted on said actuator from said second elastic portion via said cam portion.

2. The connector according to claim 1, wherein said operation portion is formed at an end of said actuator in an insertion direction of said connection object.

3. The connector according to claim 1, wherein said cam portion in said actuator comprises a plurality of cam portions arranged, and said contact comprises a plurality of contacts arranged, and said support portion is formed between a pair of said cam portions, at least throughout an arrangement region of said contacts.

4. He connector according to claim 1, wherein said support portion has a support surface configured to be in contact with said connection object in said unlock position of said actuator, and said support surface is a flat surface.

5. The connector according to claim 1, wherein at least part of said support portion is configured to be located inside said insertion groove in said unlock position of said actuator.

6. The connector according to claim 1, wherein said actuator includes a locking portion, and said locking portion is configured to engage with a locked portion of said connection object inserted in said insertion groove in said lock position of said actuator, and disengage from said locked portion in said unlock position of said actuator.

7. An electronic device comprising the connector according to claim 1.

* * * * *